US012749297B2

(12) United States Patent
Song et al.

(10) Patent No.: US 12,749,297 B2
(45) Date of Patent: Sep. 29, 2026

(54) METHOD PERFORMED BY ELECTRONIC APPARATUS, ELECTRONIC APPARATUS AND STORAGE MEDIUM FOR VIDEO PROCESSING BASED ON FEATURE MAP

(71) Applicant: SAMSUNG ELECTRONICS CO., LTD., Suwon-si (KR)

(72) Inventors: Xiansong Song, Beijing (CN); Lei Cao, Beijing (CN); Li Zuo, Beijing (CN); Jaekeun Na, Suwon-si (KR); Wei Wen, Beijing (CN); Changwei Wang, Beijing (CN); Mengmeng Bai, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 336 days.

(21) Appl. No.: 18/368,921

(22) Filed: Sep. 15, 2023

(65) Prior Publication Data

US 2024/0177466 A1 May 30, 2024

Related U.S. Application Data

(63) Continuation of application No. PCT/KR2023/013077, filed on Sep. 1, 2023.

(30) Foreign Application Priority Data

Nov. 29, 2022 (CN) ........................ 202211515180.8

(51) Int. Cl.
*G06V 10/80* (2022.01)
*G06T 7/194* (2017.01)
*G06V 10/26* (2022.01)

(52) U.S. Cl.
CPC ........... *G06V 10/806* (2022.01); *G06T 7/194* (2017.01); *G06V 10/267* (2022.01)

(58) Field of Classification Search
CPC ..... G06V 10/806; G06V 10/267; G06T 7/194
See application file for complete search history.

(56) References Cited

U.S. PATENT DOCUMENTS 10,254,854 B2 4/2019 Madmony et al.
10,810,435 B2 10/2020 Lee et al.
(Continued)

FOREIGN PATENT DOCUMENTS

CN 113269021 A 8/2021
JP 7125541 B2 8/2022
(Continued)

OTHER PUBLICATIONS

Li et al., "Towards an End-to-End Framework for Flow-Guided Video Inpainting," arXiv:2204.02663v2 [eess.IV], Apr. 2022, Total 16 pages.
(Continued)

*Primary Examiner* — Casey L Kretzer
(74) *Attorney, Agent, or Firm* — Sughrue Mion, PLLC

(57) ABSTRACT

A method performed by an electronic apparatus, includes: determining a local frame sequence from a video; obtaining a feature map sequence of the local frame sequence by encoding the local frame sequence; determining a feature flow sequence of the local frame sequence based on the feature map sequence of the local frame sequence and a mask image sequence regarding an object to be removed, the mask image sequence being corresponding to the feature map sequence; obtaining an updated feature map sequence of the local frame sequence, by performing, based on the feature flow sequence, feature fusion between adjacent feature maps in the feature map sequence; and obtaining a processed local frame sequence, by decoding the updated feature map sequence of the local frame sequence.

19 Claims, 24 Drawing Sheets

(56) References Cited

U.S. PATENT DOCUMENTS

| | | | | |
|---|---|---|---|---|
| 10,818,014 | B2 | 10/2020 | Xu et al. | |
| 11,164,326 | B2 | 11/2021 | Liu et al. | |
| 11,288,828 | B2 | 3/2022 | Wu et al. | |
| 11,526,970 | B2 | 12/2022 | El-Khamy et al. | |
| 11,544,820 | B2 | 1/2023 | Xu et al. | |
| 2020/0389665 | A1 | 12/2020 | Gao et al. | |
| 2021/0035268 | A1* | 2/2021 | Xu | G06T 5/00 |
| 2021/0383169 | A1 | 12/2021 | Wang et al. | |
| 2022/0148284 | A1 | 5/2022 | Kim et al. | |
| 2022/0156939 | A1 | 5/2022 | Homayounfar et al. | |
| 2022/0180189 | A1 | 6/2022 | Adrian et al. | |
| 2022/0222469 | A1* | 7/2022 | Rao | G06V 10/764 |
| 2024/0422324 | A1* | 12/2024 | Ge | H04N 19/30 |

FOREIGN PATENT DOCUMENTS

| | | | |
|---|---|---|---|
| KR | 10-2021-0029089 | A | 3/2021 |
| KR | 10-2022-0064857 | A | 5/2022 |
| WO | 2017/213923 | A1 | 12/2017 |

OTHER PUBLICATIONS

International Search Report (PCT/ISA/210) and Written Opinion (PCT/ISA/237) issued by the International Searching Authority on Dec. 8, 2023 in corresponding International Application No. PCT/KR2023/013077.

* cited by examiner

METHOD PERFORMED BY ELECTRONIC APPARATUS, ELECTRONIC APPARATUS AND STORAGE MEDIUM FOR VIDEO PROCESSING BASED ON FEATURE MAP

CROSS-REFERENCE TO RELATED APPLICATIONS

This application is a by-pass continuation application of International Application No. PCT/KR2023/013077, filed on Sep. 1, 2023, which is based on and claims priority to Chinese Patent Application No. 202211515180.8, filed on Nov. 29, 2022, in Chinese Intellectual Property Office, the disclosures of which are incorporated by reference herein their entireties.

BACKGROUND

1. Field

The disclosure relates to a field of video processing. In particular, the disclosure relates to a method executed by an electronic apparatus, an electronic apparatus, and a storage medium.

2. Description of Related Art

In many video application scenarios, there are technical requirements for removing objects in frames of a video and completing missing areas in the frames of the video. In particular, with popularity of mobile terminals such as smart phones and tablet computers, the demand for people to use the mobile terminals for video shooting and video processing is increasing gradually. However, in related technologies, the efficiency of techniques such as object removal or missing area completion in the video frames is low.

How to efficiently remove objects or complete missing areas to better meet user needs is a technical problem that technicians in the art have been working hard to study.

SUMMARY

In order to at least solve the above problems existing in the prior art, the disclosure provides a method performed by an electronic apparatus, an electronic apparatus, and a storage medium.

According to an aspect of the disclosure, a method performed by an electronic apparatus, includes: determining a local frame sequence from a video; obtaining a feature map sequence of the local frame sequence by encoding the local frame sequence; determining a feature flow sequence of the local frame sequence based on the feature map sequence of the local frame sequence and a mask image sequence of an object to be removed, the mask image sequence being corresponding to the feature map sequence; obtaining an updated feature map sequence of the local frame sequence, by performing, based on the feature flow sequence, feature fusion between adjacent feature maps in the feature map sequence; and obtaining a processed local frame sequence, by decoding the updated feature map sequence of the local frame sequence.

According to another aspect of the disclosure, a method performed by an electronic apparatus, includes: determining a local frame sequence from a video sequence of a video; and determining a reference frame sequence corresponding to the local frame sequence, from the video, and performing inpainting processing for the local frame sequence based on the reference frame sequence, wherein the determining the reference frame sequence corresponding to the local frame sequence from the video includes: determining a candidate frame sequence from a video sequence to which a local frame sequence belongs, wherein the candidate frame sequence comprises image frames in the video sequence excluding the local frame sequence; and selecting the reference frame sequence corresponding to the local frame sequence from the candidate frame sequence based on a similarity between a frame image in the candidate frame sequence and a frame image in the local frame sequence, wherein the similarity represents a correlation of a background area and an uncorrelation of a foreground area between the frame image in the candidate frame sequence and the frame image in the local frame sequence.

The beneficial effects of the technical solutions provided by the disclosure will be described later in combination with specific optional embodiments, or may be learned from descriptions of the embodiments, or may be learned from implementation of the embodiments.

BRIEF DESCRIPTION OF DRAWINGS

In order to more clearly and easily explain and understand technical solutions in embodiments of the disclosure, the following will briefly introduce the drawings needed to be used in the description of the embodiments of the disclosure.

DETAILED DESCRIPTION OF EMBODIMENTS

Embodiments of the disclosure are described below in conjunction with the accompanying drawings in the disclosure. It should be understood that the embodiments described below in combination with the accompanying drawings are exemplary descriptions for explaining technical solutions of the embodiments of the disclosure, and do not constitute restrictions on the technical solutions of the embodiments of the disclosure.

It may be understood by those skilled in the art that singular forms “a”, “an”, “the” and “this” used herein may also include plural forms unless specifically stated. It should be further understood that the terms “include” and “comprise” used in the embodiments of the disclosure mean that a corresponding feature may be implemented as the presented feature, information, data, step, operation, element, and/or component, but do not exclude implement of other features, information, data, steps, operations, elements, components and/or a combination thereof, which are supported in the present technical field. It should be understood that, when we state that one element is “connected” or “coupled” to another element, this element may be directly connected or coupled to the another element, or it may mean that a connection relationship between this element and the another element is established through an intermediate element. In addition, “connection” or “coupling” used herein may include a wireless connection or wireless coupling. The term “and/or” used herein represents at least one of items defined by this term, for example, “A and/or B” may be implemented as “A”, or “B”, or “A and B”. When describing a plurality of (two or more) items, if a relationship between the plurality of items is not clearly defined, between the plurality of items may refer to one, more or all of the plurality of items. For example, for a description of “a parameter A includes A1, A2, A3”, it may be implemented that the parameter A includes A1, or A2, or A3, and it may also be implemented that the parameter A includes at least two of the three parameters A1, A2, A3.

Figure 1:
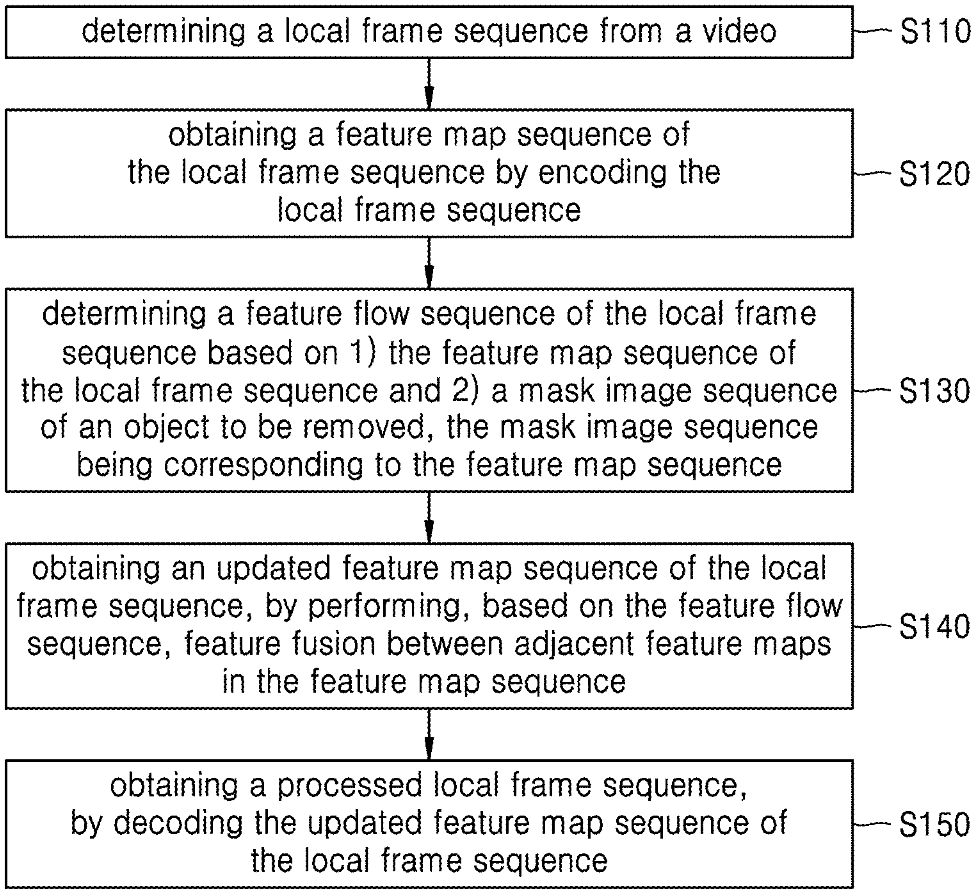
FIG. 1 illustrates a method performed by an electronic apparatus according to an exemplary embodiment of the disclosure.

FIG. 1 is a flowchart showing a method performed by an electronic apparatus according to an exemplary embodiment of the disclosure.

In operation S110, at least one (or a) local frame sequence is determined from a video. This is described below with reference to FIG. 2.

Figure 2:
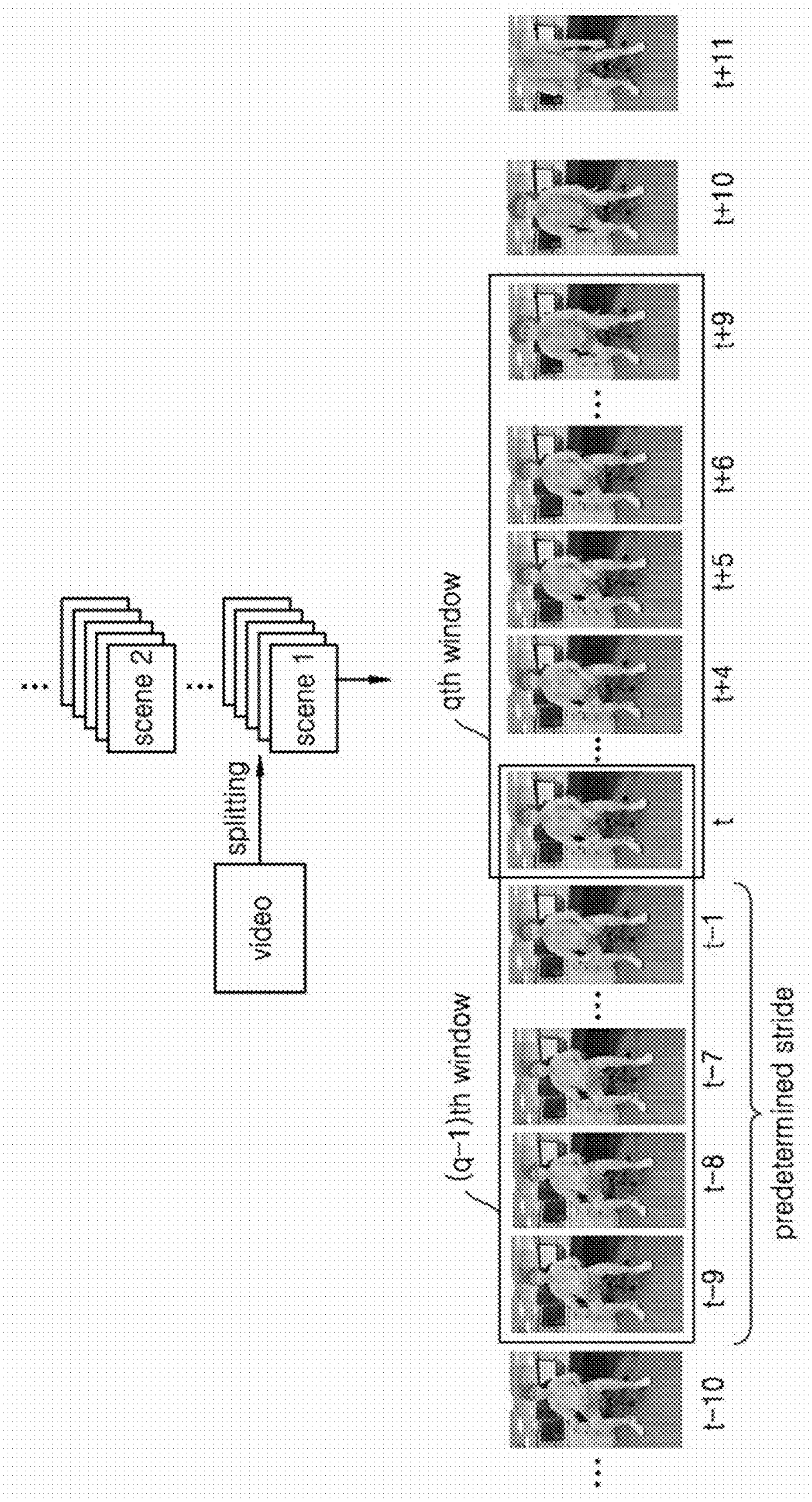
FIG. 2 illustrates a process of determining a local frame sequence according to an exemplary embodiment of the disclosure.

First, the video is split based on scene information to obtain at least one video sequence. As shown in FIG. 2, the scene information may be obtained by performing scene detection on the input video by a scene detection algorithm, and then, the scene information is used to split different scenes in the video to obtain the at least one video sequence, wherein each video sequence belongs to one scene.

Then, the at least one local frame sequence is obtained, by selecting a predetermined number of consecutive image frames (also referred to as video frames) from each video sequence according to a predetermined stride as the local frame sequence, wherein the predetermined stride is less than or equal to the predetermined number. As shown in FIG. 2, the predetermined number of consecutive image frames may be selected from each video sequence as the local frame sequence in a manner of a sliding window, wherein, a size of the sliding window is the predetermined number. In addition, a distance of each slide of the sliding window is the predetermined stride shown in FIG. 2. The predetermined stride of the sliding window shown in FIG. 2 is smaller than the size of the sliding window (i.e., the predetermined number). FIG. 2 is only an exemplary diagram. The predetermined stride and the predetermined number used in the disclosure may be other values, and the predetermined stride may also be equal to the predetermined number. When the predetermined stride is less than the predetermined number, there will be a partial overlap between the two sliding windows before and after, which enables information of a local frame sequence in a previous sliding window to be effectively transferred to a local frame sequence in a next sliding window, thus avoiding discontinuity in a final inpainted video, that is, avoiding video jitter and other phenomena when switching between two adjacent local frame sequences.

After operation S110, operations S120 to S150 as shown in FIG. 1 are performed with respect to each of the (at least one) local frame sequence.

In operation S120, a feature map sequence of a current local frame sequence is obtained by encoding the current local frame sequence. A ‘feature’ may be a piece of information about the content of an image; typically about whether a certain region of the image has certain properties. Features may include information about specific structures in the image such as points, edges or objects.

Specifically, each local frame image in the current local frame sequence is input to a convolutional network encoder for encoding, to obtain a feature map of each local frame image, thus obtaining the feature map sequence of the current local frame sequence. Here, the convolutional network encoder may be any convolutional network encoder that may extract a feature map from an image.

In operation S130, a feature flow sequence of the current local frame sequence is determined based on the feature map sequence of the current local frame sequence and a corresponding mask image sequence of an object to be removed (or a mask image sequence corresponding to the feature map sequence of the current local frame sequence).

Specifically, the determining the feature flow sequence of the current local frame sequence based on the feature map sequence of the current local frame sequence and the corresponding mask image sequence of the object to be removed includes: determining an occlusion mask image sequence and the feature flow sequence of the current local frame sequence based on the feature map sequence of the current local frame sequence and the corresponding mask image sequence of the object to be removed.

Here, when determining the occlusion mask image sequence and the feature flow sequence of the current local frame sequence, the following operations are performed for each frame image in the current local frame sequence: selecting two frames of feature map corresponding to a current frame image and its adjacent frame image from the feature map sequence of the current local frame sequence, and selecting two frames of mask images of the object to be removed corresponding to the current frame image and the adjacent frame image from the mask image sequence of the object to be removed corresponding to the current local frame sequence; estimating a feature flow and the occlusion mask image from the adjacent frame image to the current frame image by using a feature flow estimation module, based on the two frames of feature maps and the two frames of the mask images of the object to be removed.

In the disclosure, in order to make a video processing (for example, removing an object from the video, completing a missing area, etc.) more effective, the method proposed in the disclosure may be used to perform a corresponding processing in turn based on an order from the first frame image to the last frame image of each video sequence (this process may be referred to as referred to as one forward traversal processing), then, a corresponding processing is performed based on an order from the last frame image to the first frame image of the video sequence (this process may be referred to as one backward traversal processing). One forward traversal processing and one backward traversal processing may be referred to as one bidirectional traversal processing. In the disclosure, at least one bidirectional traversal processing may be performed. In addition, the disclosure also proposes that whenever the bidirectional traversal process is performed, the backward traversal process may be performed first and then the forward traversal process may be performed.

In the disclosure, the adjacent frame image of the current frame image may be a previous frame image of the current frame image or a next frame image of the current frame image. In the following description, for the convenience of description, it is assumed that the current frame image is represented by the t-th frame image, and the adjacent frame image of the current frame image is represented by the (t+1)th frame image. A process of using the feature flow estimation module to estimate the feature flow and the occlusion mask image from the adjacent frame image to the current frame image is described in detail below with reference to FIGS. 3, 4 and 5.

Figure 3:
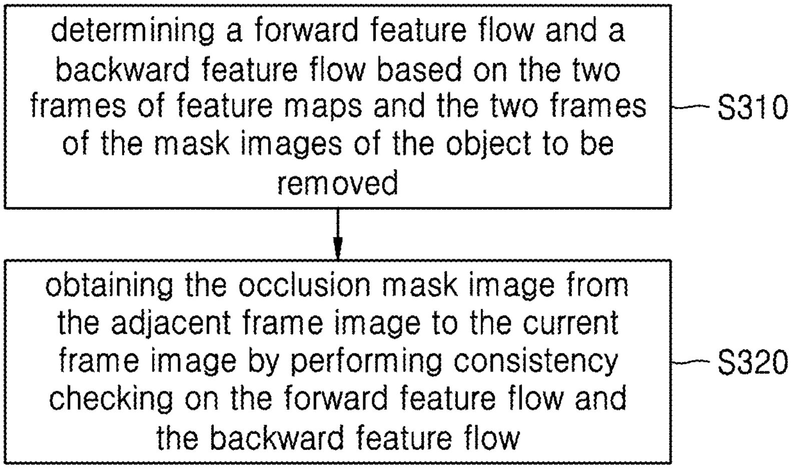
FIG. 3 illustrates a process of using a feature flow estimation module to estimate a feature flow and an occlusion mask image from a local frame image to a current frame image according to an exemplary embodiment of the disclosure.
Figure 4:
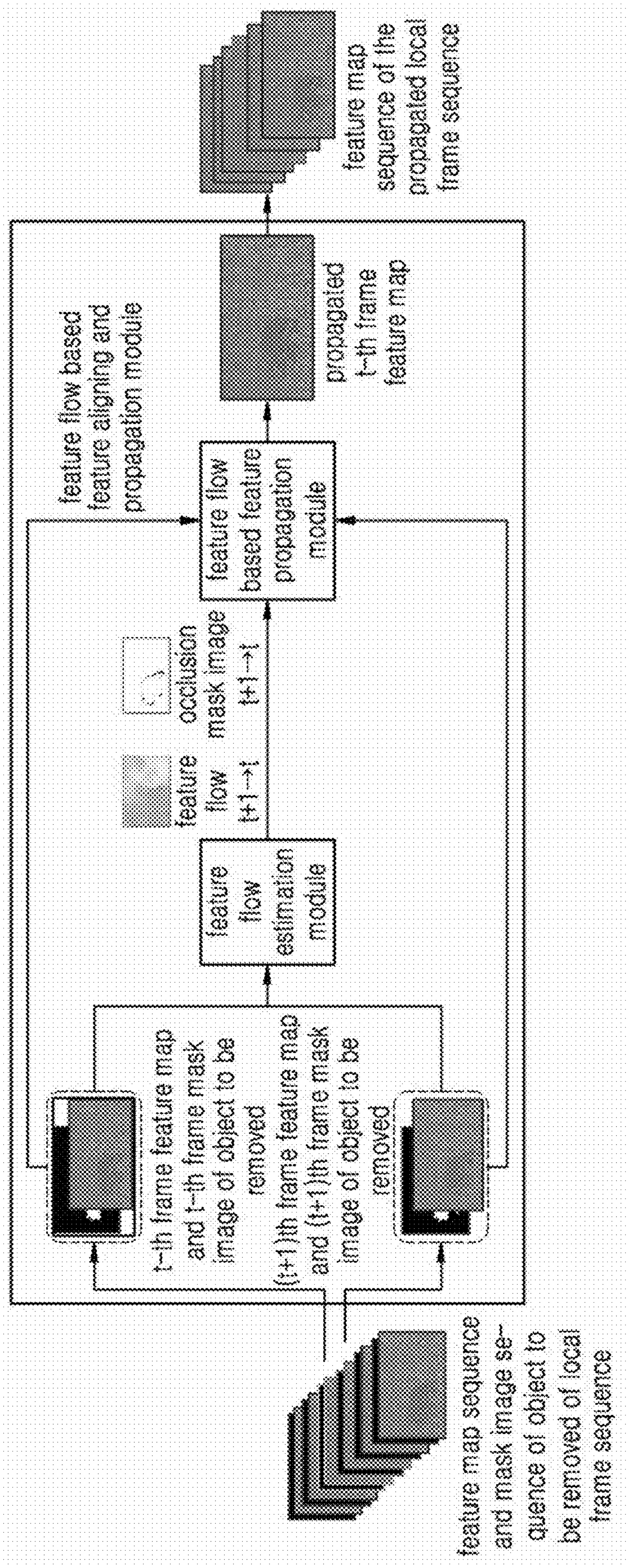
FIG. 4 illustrates a feature flow based feature aligning and propagation module according to an exemplary embodiment of the disclosure.
Figure 5:
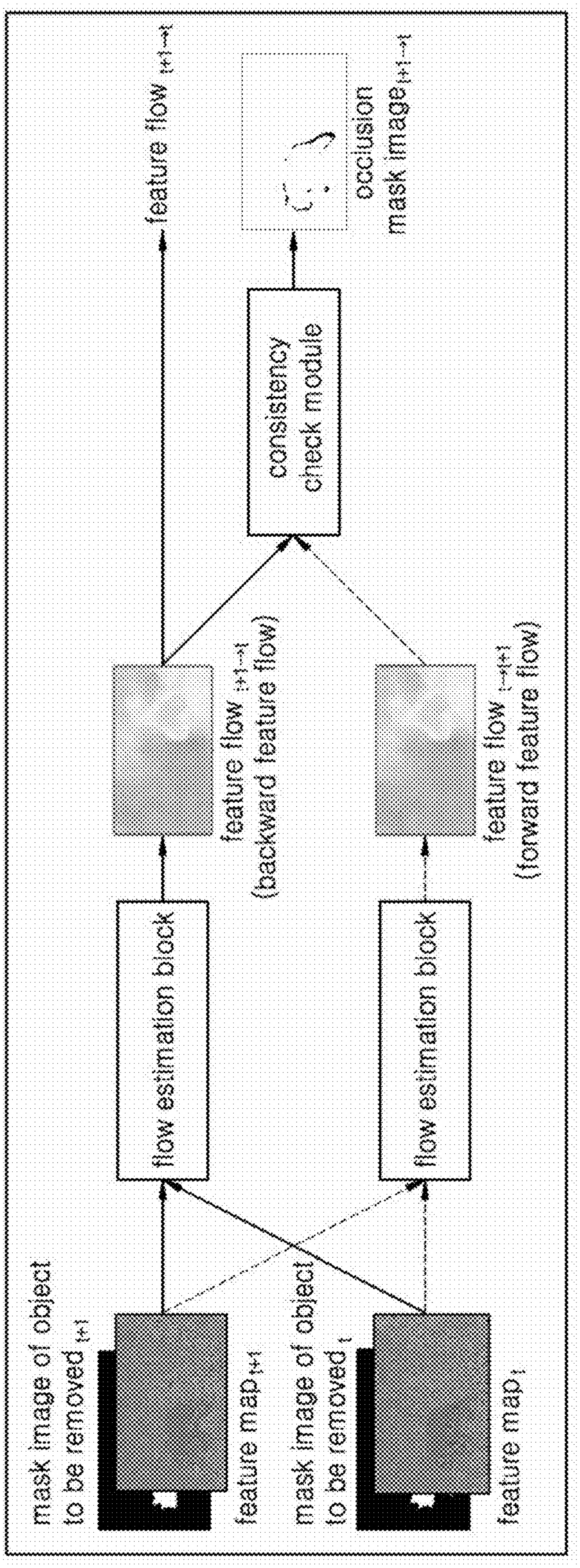
FIG. 5 illustrates a feature flow estimation module according to an exemplary embodiment of the disclosure.

FIG. 3 is a flowchart showing the process of using the feature flow estimation module to estimate the feature flow and the occlusion mask image from the adjacent frame image to the current frame image according to an exemplary embodiment of the disclosure. FIG. 4 is a schematic diagram showing a feature flow based feature aligning and propagation module according to an exemplary embodiment of the disclosure. FIG. 5 is a structural diagram showing a feature flow estimation module according to an exemplary embodiment of the disclosure.

In operation S310, a forward feature flow and a backward feature flow are determined based on the two frames of feature maps and the two frames of the mask images of the object to be removed, of the current frame image and its adjacent frame image, wherein, when the adjacent frame image is the next frame image of the current frame image, the forward feature flow represents a feature flow from the current frame image to the adjacent frame image, and the backward feature flow represents a feature flow from the adjacent frame image to the current frame image; when the adjacent frame image is the previous frame image of the current frame image, the backward feature flow represents the feature flow from the current frame image to the adjacent frame image, and the forward feature flow represents the feature flow from the adjacent frame image to the current frame image.

As shown in FIG. 4, a current feature map corresponding to the current frame image (for example, the t-th frame feature $map_t$), an adjacent feature map corresponding to the adjacent frame image of the current frame image (for example, the (t+1)th frame feature $map_{t+1}$), a mask image of the object to be removed corresponding to the current frame image (for example, a t-th frame mask image of the object to be $removed_t$), and a mask image of the object to be removed corresponding to the adjacent frame image of the current frame image (for example, a (t+1)th frame mask image of the object to be $removed_{t+1}$) are input to the feature flow estimation module in the feature flow based feature aligning and propagation module for feature flow estimation. Specifically, as shown in FIG. 5, the above four inputs are input into the upper and lower flow estimation blocks for feature flow estimation, wherein the flow estimation block at the upper of FIG. 5 performs the feature flow estimation based on these four inputs to obtain the backward feature flow, such as the feature $flow_{t+i\rightarrow t}$ from the adjacent frame image to the current frame image. In addition, the flow estimation block at the lower of FIG. 5 performs the feature flow estimation based on these four inputs to obtain the forward feature flow, such as, the feature $flow_{t\rightarrow t+1}$ from the current frame image to the adjacent frame image. Here, by using the flow estimation block to weight the input feature map with the mask image of the object to be removed, features corresponding to a mask area of the object to be removed in the feature map (that is, the features of the area where the object to be removed is located) are suppressed, and the weighted feature map is used to calculate the feature flow.

In operation S320, the occlusion mask image from the adjacent frame image to the current frame image is obtained by performing consistency checking on the forward feature flow and the backward feature flow.

As shown in FIG. 5, the occlusion mask image from the adjacent frame image to the current frame image (for example, the occlusion mask $image_{t+i\rightarrow t}$ from the (t+1)th frame image to the t-th frame image) may be determined by performing consistency checking on the forward feature flow and the backward feature flow by a consistency check module in the feature flow estimation module.

Figure 6:
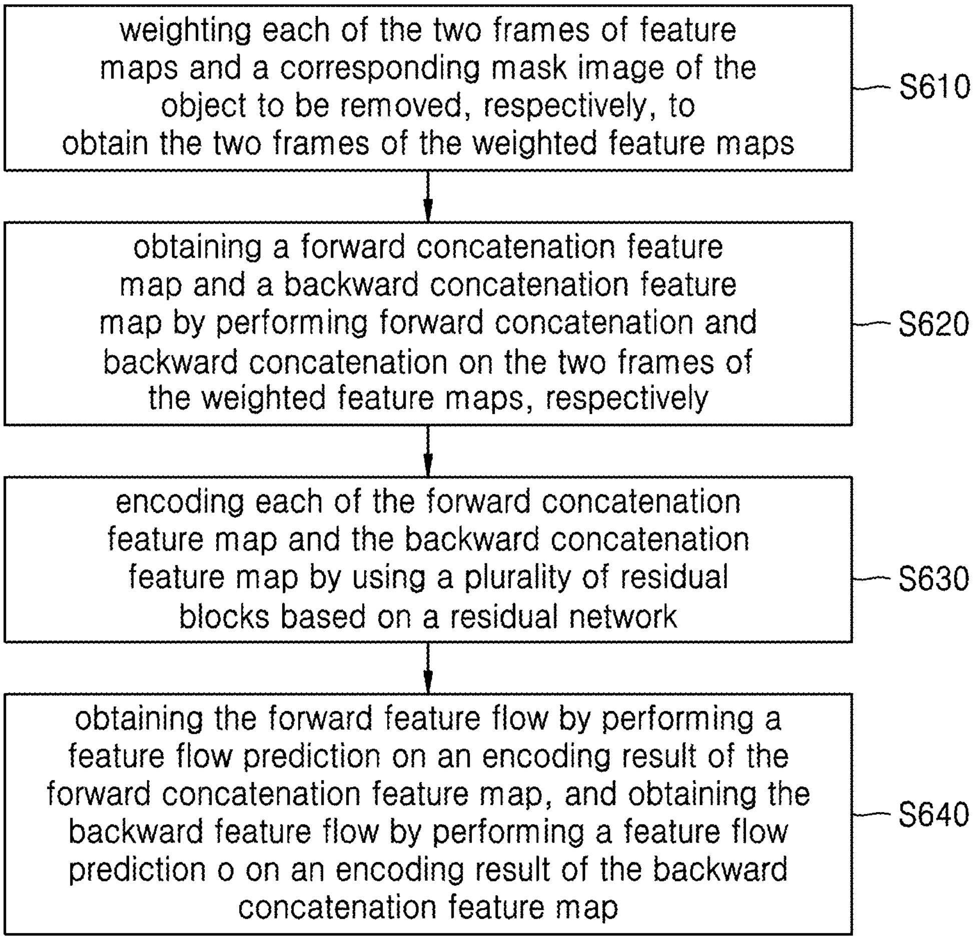
FIG. 6 illustrates a process of obtaining a forward feature flow and a backward feature flow through feature flow estimation according to an exemplary embodiment of the disclosure.
Figure 7:
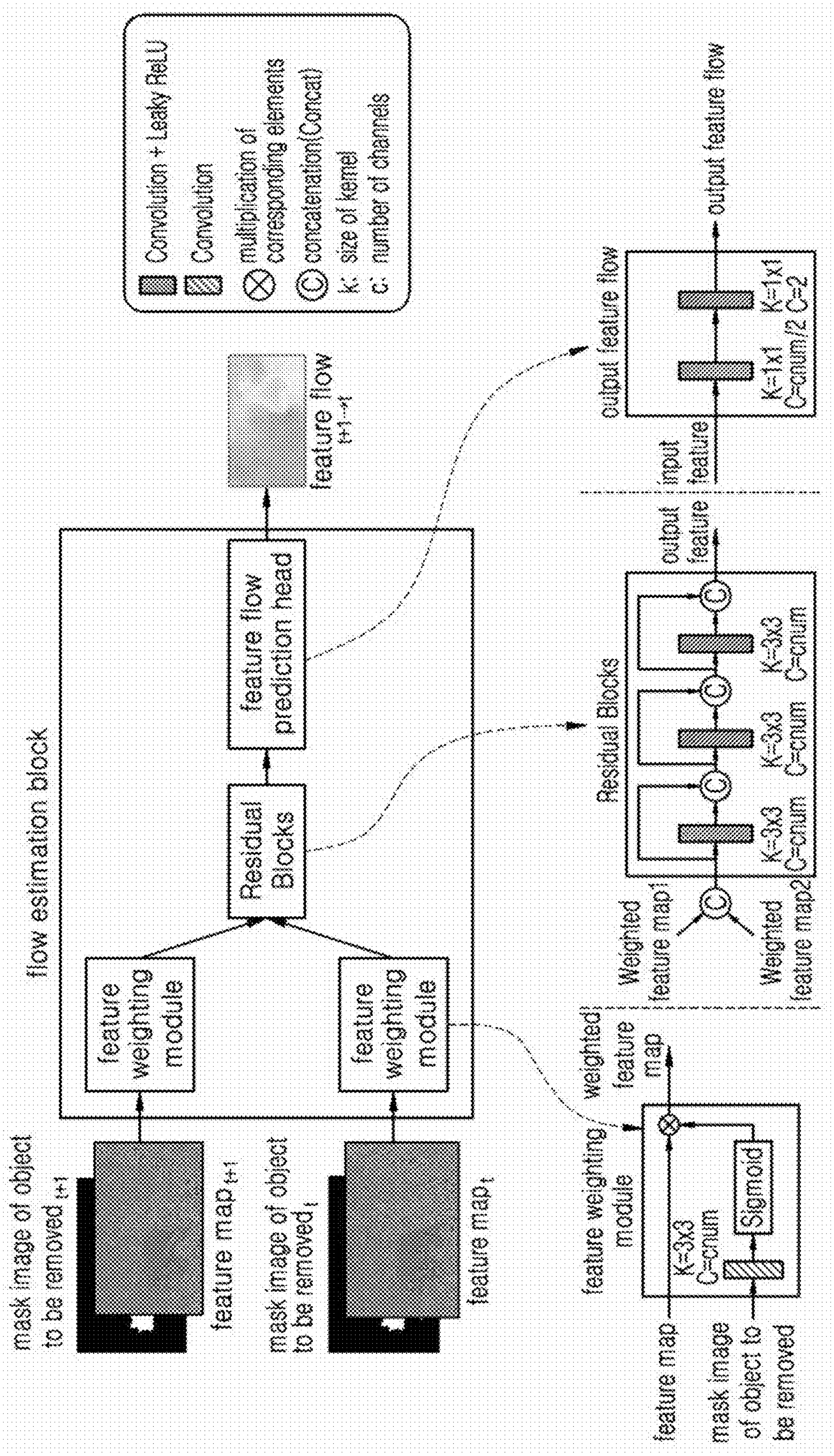
FIG. 7 illustrates a flow estimation block in FIG. 5 according to an exemplary embodiment of the disclosure.

The process of FIG. 3 is described in detail below with reference to FIGS. 6 and 7. FIG. 6 is a flowchart showing a process of obtaining a forward feature flow and a backward feature flow through feature flow estimation according to an exemplary embodiment of the disclosure. The two flow estimation blocks shown in FIG. 5 may be the same (sharing model parameters) and may perform operations in parallel. FIG. 7 is a structural diagram showing a flow estimation block in FIG. 5 according to an exemplary embodiment of the disclosure. For the convenience of description, the processing procedures of the two flow estimation blocks shown in FIG. 5 are described below.

In operation S610, each of the two frames of feature maps and a corresponding mask image of the object to be removed are weighted, respectively, to obtain the two frames of the weighted feature maps.

As shown in FIG. 7, the current feature map (for example, the t-th frame feature $map_t$) and the corresponding mask image of the object to be removed (for example, the t-th frame mask image of the object to be $removed_t$) are input to the feature weighting module at the lower left of FIG. 7 for weighting processing. Specifically, the t-th frame mask image of the object to be $removed_t$ is firstly convolved through a convolution layer (as an example, a size of a convolution kernel of the convolution layer is K=3×3, the number of channels C of the convolution kernel may be cnum, wherein cnum may be any suitable number, which is not limited in the disclosure), and then a nonlinear activation function Sigmaid is used to perform nonlinear-processing on the convolution result, and finally, the nonlinear-processed t-th frame mask image of the object to be $removed_t$ is weighted by using the t-th frame feature $map_t$, to suppress the features of the area where the object to be removed is located, so as to obtain the weighted t-th frame feature $map_t$. Similarly, the adjacent feature map of the adjacent frame image (for example, the (t+1)th frame feature map t+1) and the corresponding mask image of the object to be removed (for example, the (t+1)th frame mask image of the object to be $removed_{t+1}$) are input to the feature weighting module at the upper of FIG. 7 for weighting processing, so as to obtain the weighted (t+1)th frame feature $map_{t+1}$.

In operation S620, a forward concatenation feature map and a backward concatenation feature map are obtained by performing forward concatenation and backward concatenation on the two frames of the weighted feature maps, respectively.

As shown in FIG. 7, the forward concatenation is performed by concatenating the weighted t-th frame feature $map_t$ in front of the (t+1)th frame feature $map_{t+1}$ to obtain the forward concatenation feature map. Similarly, the backward concatenation is performed by concatenating the weighted (t+1)th frame feature $map_{t+1}$ in front of the t-th frame feature $map_t$ to obtain the backward concatenation feature map.

In operation S630, each of the forward concatenation feature map and the backward concatenation feature map is encoded by using a plurality of residual blocks based on a residual network.

As shown in FIG. 7, a plurality of residual blocks in the flow estimation block may be composed of three "convolution+Leaky ReLU activation function" structures, and an input of each "convolution+Leaky ReLU activation function" structure is concatenated with its output, and then the concatenation result is used as an input of the next "convolution+Leaky ReLU activation function" structure, and finally the encoding of the forward concatenation feature map and the encoding of the backward concatenation feature map are completed, respectively. Wherein, as shown in FIG. 7, the size K of the convolution kernel of the convolution layer in the "convolution+Leaky ReLU activation function" structure may be 3×3. The number of channels C of the convolution kernel may be cnum.

In operation S640, the forward feature flow is obtained by performing a feature flow prediction on an encoding result of the forward concatenation feature map, and the backward feature flow is obtained by performing a feature flow prediction on an encoding result of the backward concatenation feature map.

As shown in FIG. 7, for the encoding result of the forward concatenation feature map obtained through operation S630, a feature flow prediction head including two layers of "convolution+Leaky ReLU activation function" structure is used to perform the feature flow prediction to obtain the forward feature flow, wherein the size K of the convolution kernel of the convolution layer may be 1×1, the number of channel C of the convolution kernel of the convolution layer in the first layer of "convolution+Leaky ReLU activation function" structure may be cnum/2, and the channel number C of the convolution kernel of the convolution layer in the second layer of "convolution+Leaky ReLU activation function" structure may be 2. Similarly, the backward feature flow may be obtained by performing the feature flow prediction on the encoding result of the backward concatenation feature map by the feature flow prediction head shown in FIG. 7.

Through the process in FIG. 6, the forward feature flow and the backward feature flow may be obtained, and then consistency checking may be performed through the consistency check module shown in FIG. 5, so as to obtain the occlusion mask image from the adjacent frame image to the current frame image.

Specifically, for each point A in the adjacent feature map (for example, the (t+1)th frame feature $map_{t+1}$), a corresponding point A' in the current feature map (for example, the t-th frame feature map) is determined using the backward feature flow. In detail, it assumed that point A is (x, y), then the corresponding point A' of point A in the t-th frame feature $map_t$ is (x, y)+$flow_{t+1\rightarrow t}$(x, y).

When a feature flow value at the point A in the backward feature flow and a feature flow value at the corresponding point A' in the forward feature flow meet a predetermined condition, the point A is determined as an occlusion point, wherein all the occlusion points determined are used to constitute an occlusion mask image from the adjacent frame image to the current frame image. Specifically, when the current feature flow is completely consistent with the backward feature flow, absolute feature flow values at the point A and the point A' are the same but their signs are opposite, that is, a sum of their corresponding feature flows is zero: $flow_{t\rightarrow t+1}(A')+flow_{t+1\rightarrow t}(A)=0$. However, considering an calculation error, when the point A: (x, y) meets the following formula (1), the point A is referred to as an occlusion point:

$$|flow_{t\rightarrow t+1}(A')+flow_{t+1\rightarrow t}(A)|^2>\theta \quad (1)$$

Among them, θ is a threshold greater than zero. Therefore, by performing the above processing for each point A in the adjacent feature map (for example, the (t+1)th frame feature $map_{t+1}$), all points A satisfying equation (1) may be determined, and these points may constitute the occlusion mask image from the adjacent frame image to the current frame image.

FIG. 3 described above is only an exemplary embodiment of the process of using the feature flow estimation module to estimate the feature flow and occlusion mask image from the adjacent frame image to the current frame image of the disclosure, and FIG. 5 only shows an exemplary structure of the feature flow estimation module of the disclosure. The application is not limited to this. The feature flow estimation module used in operation S130 may have a pyramid structure composed of multiple levels of feature flow estimators, that is, the feature flow estimation module may have N levels of feature flow estimators, wherein N is a positive integer greater than or equal to 1. This will be described in detail below with reference to FIGS. 8 to 11.

Figure 8:
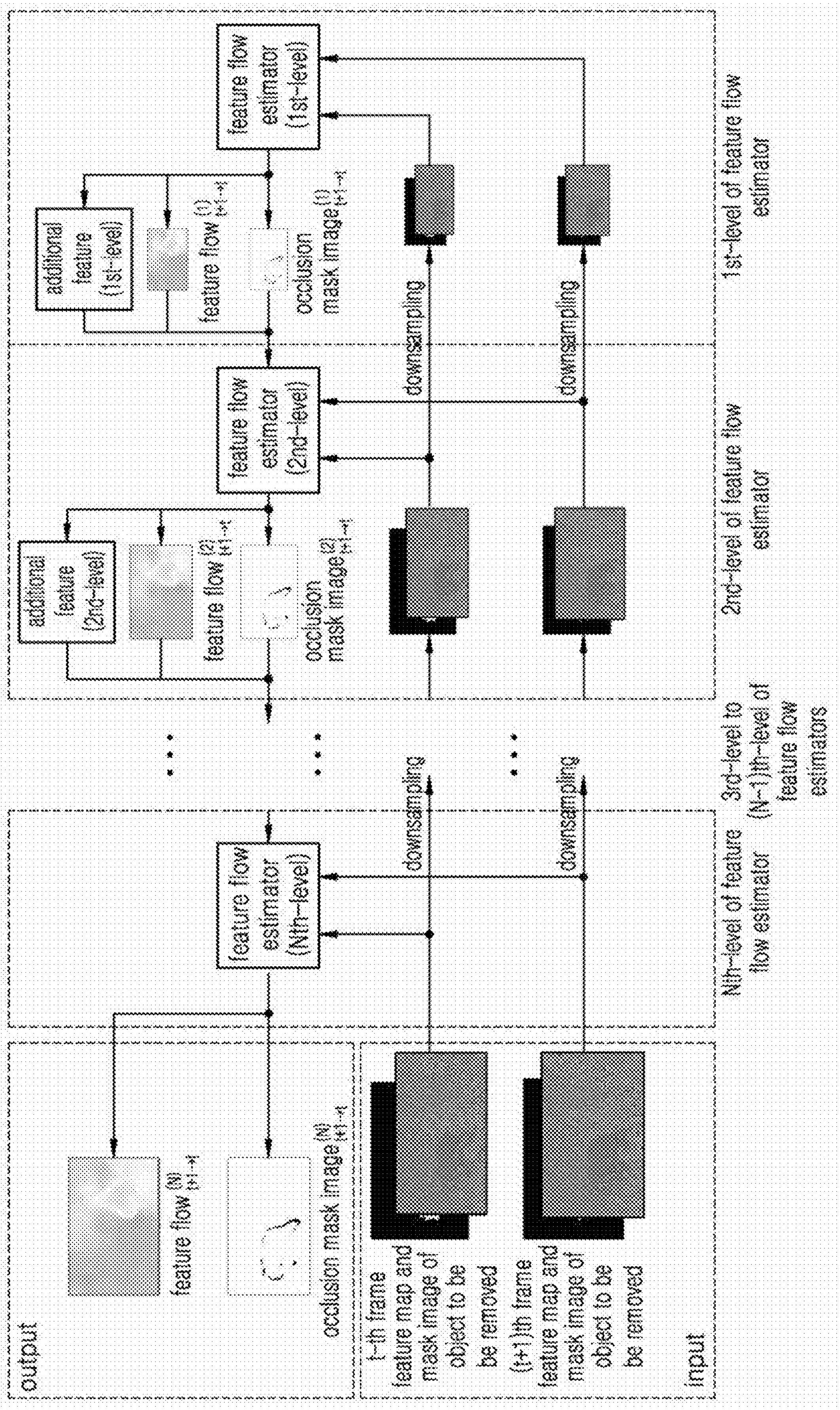
FIG. 8 illustrates a feature flow estimation module according to another exemplary embodiment of the disclosure.

FIG. 8 is a structural diagram showing a feature flow estimation module according to another exemplary embodiment of the disclosure.

The feature flow estimation module shown in FIG. 8 is a feature flow estimation module with an N-level pyramid structure, that is, it includes N feature flow estimators, wherein N is a positive integer greater than or equal to 1. For example, the feature flow estimation module may have a 2-level pyramid structure, a 3-level pyramid structure, a 4-level pyramid structure, a 5-level pyramid structure, and the like. In addition, the feature flow estimation module may also be composed of only a 1 level of feature flow estimator. At this time, a structure of the feature flow estimation module is that of the feature flow estimation module shown in FIG. 5.

In addition, for each level of feature flow estimator (also referred to as flow estimator, for short), of which input includes the feature map and the mask image of the object to be removed having a corresponding resolution. That is, for the feature flow estimation module with a N-level pyramid structure of N feature flow estimators, N−1 times downsampling is required for the feature map and the mask image of the object to be removed having an original resolution. Therefore, inputs of the 1st-level of feature flow estimator in the most right side of the FIG. 8 include the feature map and the mask image of the object to be removed obtained from the (N−1)th downsampling, inputs of the nth-level of feature flow estimator include the feature map and the mask image of the object to be removed obtained from the (N−n)th downsampling, wherein n is a positive integer greater than or equal to 2 and less than or equal to N. For example, when N=3, that is, when the feature flow estimation module shown in FIG. 8 has 3 levels of flow estimators, the t-th frame feature $map_t$ and the t-th frame mask image of the object to be $removed_t$ corresponding to the current frame image, and the (t+1)th frame feature $map_{t+1}$ and the (t+1)th frame mask image of the object to be $removed_{t+1}$ corresponding to the adjacent frame image, respectively, are downsampled twice, inputs of the 1st-level of feature flow estimator include two frames of feature maps and two frames of mask images of the object to be removed obtained from the (N−1)th downsampling (i.e. twice downsamplings) (that is, the t-th frame feature $map_t$, the (t+1)th frame feature $map_{t+1}$, the t-th frame mask image of the object to be $removed_t$, and the (t+1)th frame mask image of the object to be $removed_{t+1}$ after the (N−1)th downsampling), inputs of the 2nd-level of feature flow estimator includes two frames of feature maps and two frames of mask images of the object to be removed obtained from N−2 downsamplings (i.e. once), inputs of the 3rd-level of feature flow estimator include two frames of feature maps and two frames of mask images of the object to be removed obtained from N−3 downsamplings. Here, since N is 3, N−3 (i.e. 0) downsamplings means no downsampling.

Therefore, when the feature flow estimation module has an N levels of feature flow estimators (N is a positive integer greater than or equal to 1), the estimating the feature flow and the occlusion mask image from the adjacent frame image to the current frame image by using the feature flow estimation module includes: for a 1st-level of feature flow estimator, performing feature flow estimation by using two frames of feature maps and two frames of mask images of the object to be removed obtained from the (N−1)th downsampling, to generate a 1st-level of forward feature flow and a 1st-level of backward feature flow, wherein the forward feature flow represents a 1st-level of feature flow from the current frame image to the adjacent frame image, and the backward feature flow represents a 1st-level of feature flow from the adjacent frame image to the current frame image; obtaining a 1st-level of occlusion mask image from the adjacent frame image to the current frame image by performing the consistency checking on the forward feature flow and the backward feature flow.

If N=1, the feature flow estimation module only has one feature flow estimator, at this time, the feature flow estimator may have the structure of the feature flow estimation module shown in FIG. 5.

Figure 9:
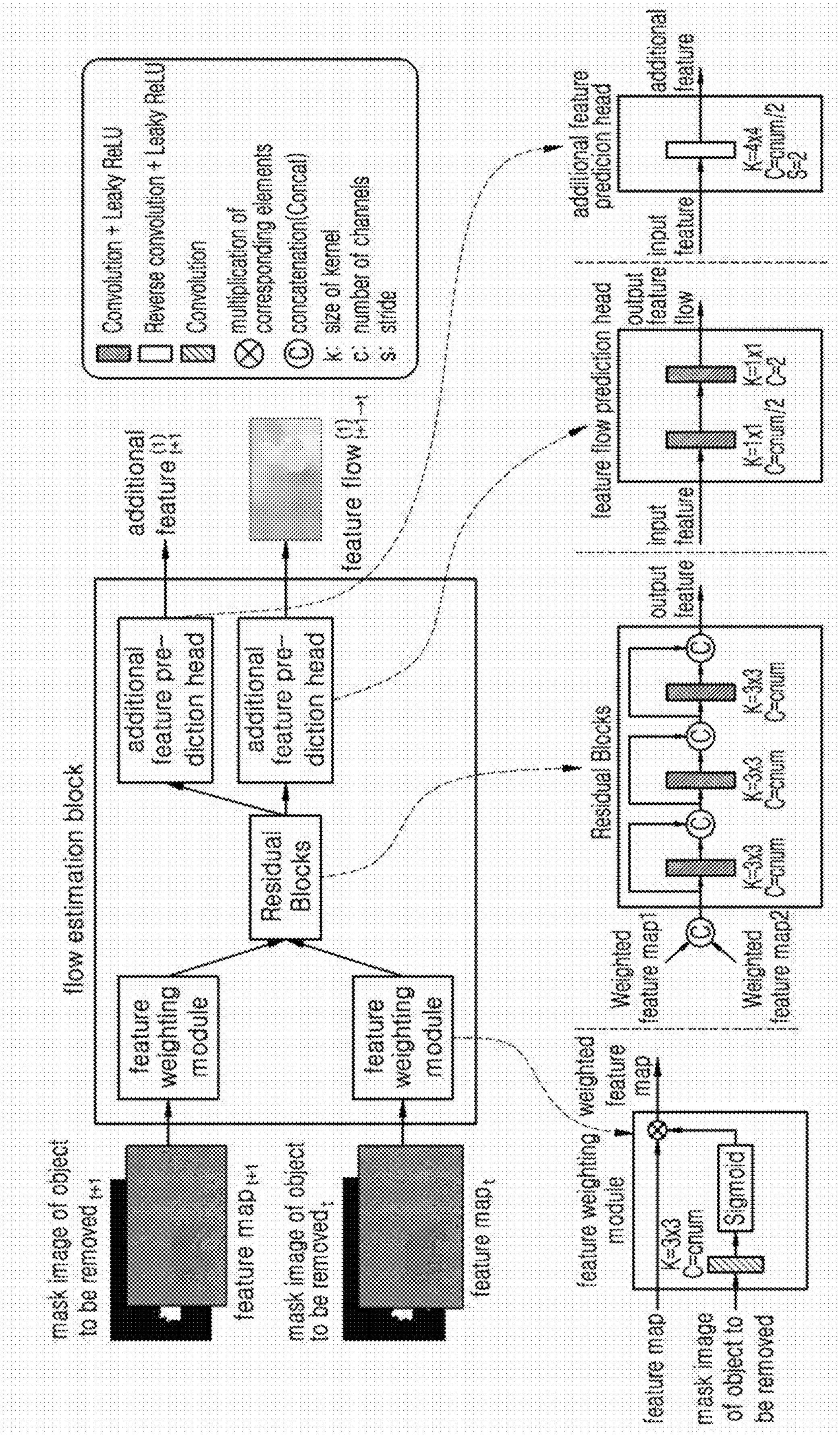
FIG. 9 illustrates the flow estimation block in FIG. 5 according to another exemplary embodiment of the disclosure.

If N is greater than or equal to 2, the 1st-level of feature flow estimator has a structure similar to that shown in FIG. 5, except that in the 1st-level of feature flow estimator, the flow estimation block used to generate the backward feature flow (that is, the flow estimation block in the upper of FIG. 5) has a structure of the flow estimation block as shown in FIG. 9. In addition, the inputs of each flow estimation block in the 1st-level of feature flow estimator are the feature maps (that is, the t-th frame feature $map_t$ and the (t+1)th frame feature $map_{t+1}$ obtained from the Nth downsampling) and the mask images of the object to be removed (that is, the t-th frame mask image of the object to be $removed_t$, and the (t+1)th frame mask image of the object to be $removed_{t+1}$ obtained from the Nth downsampling) obtained from the Nth downsampling, wherein, the structure of the flow estimation block shown in FIG. 9 is similar to that of the flow estimation block shown in FIG. 7, except that the flow estimation block shown in FIG. 9 also includes an additional feature prediction head, which includes one level of "deconvolution+Leaky ReLU activation function" structure, wherein a size K of the deconvolution convolution kernel may be 4×4, stride S may be 2, and the number of channels C of the convolution kernel may be cnum/2. The additional feature prediction head is used to perform an additional feature prediction by using the encoding result of the backward concatenation feature output from a plurality of residual blocks, to obtain a 1st-level of additional feature. The additional feature is used to indicate an occlusion area in an occlusion mask image generated by the 1st-level of feature flow estimator, so that the next-level of feature flow estimator may refine the occlusion mask image. Since the process of generating the feature flow and mask image from adjacent frame image to the current frame image has been described above with reference to FIGS. 5 to 7, the process of generating the 1st-level of feature flow and occlusion mask image from adjacent frame image to the current frame image by the 1st-level of feature flow estimator when N is a positive integer greater than or equal to 2 will not be repeated here.

In addition, when the feature flow estimation module has N levels of feature flow estimators (N is a positive integer greater than or equal to 1), the estimating the feature flow and the occlusion mask image from the adjacent frame image to the current frame image by using the feature flow estimation module includes: if N is greater than or equal to 2, for a nth-level of feature flow estimator, generating a nth-level of feature flow and an nth-level of occlusion mask image from the adjacent frame image to the current frame image, by using two frames of feature maps and two frames of mask images of the object to be removed obtained from the (N−n)th downsampling, and a (n−1)th-level of feature flow, an (n−1)th-level of occlusion mask image from the adjacent frame image to the current frame image and an (n−1)th-level of additional feature generated by a (n−1)th-level of feature flow estimator, wherein n is a positive integer greater than or equal to 2 and less than or equal to N, wherein an additional feature generated by each of the 1st to (N−1)th levels of feature flow estimators is used indicate an occlusion area in an occlusion mask image generated by a corresponding level of feature flow estimator. This will be described below with reference to FIGS. 10 and 11.

Figure 10:
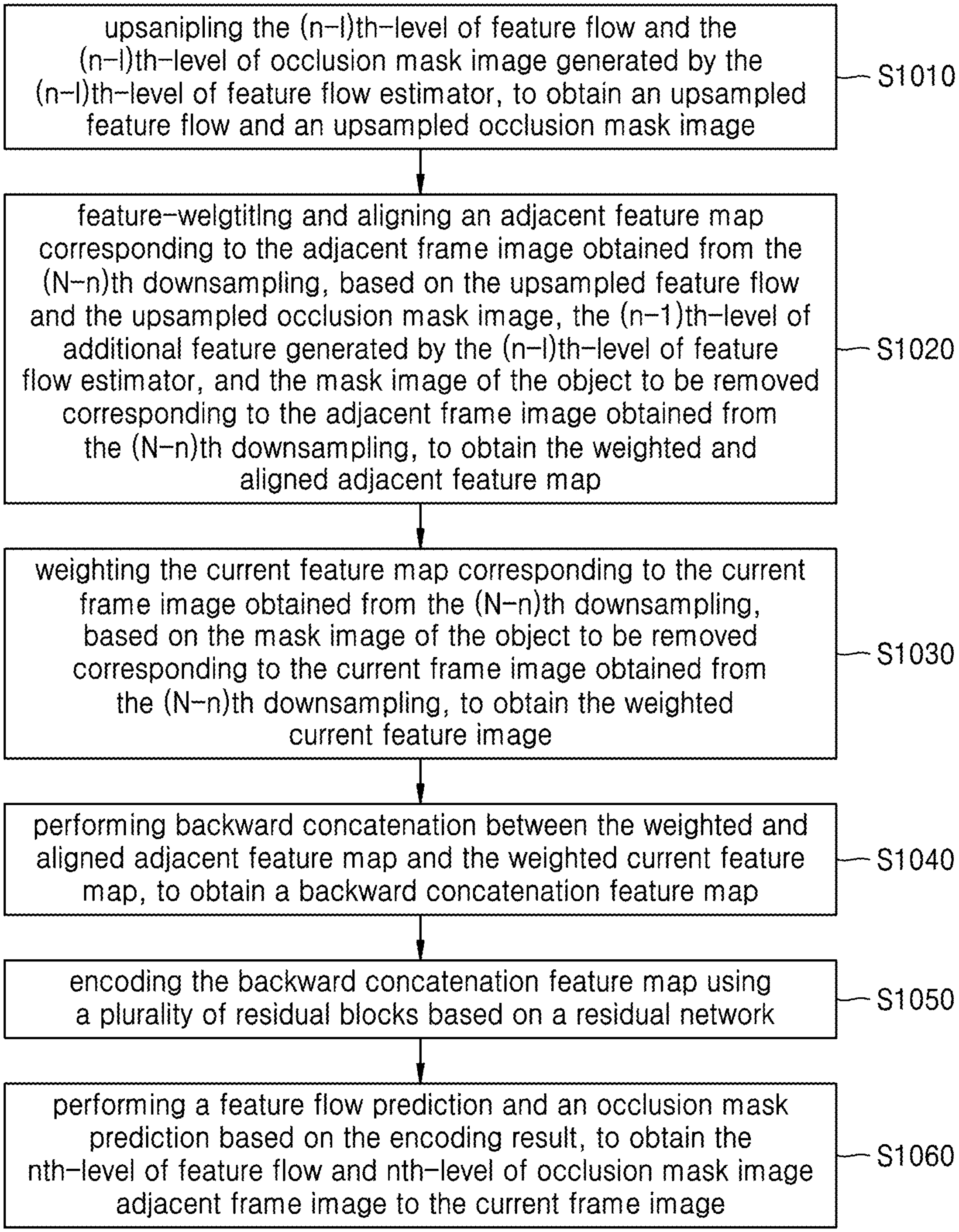
FIG. 10 illustrates a process of obtaining a feature flow and an occlusion mask image by a nth-level of feature flow estimator in a second-level to an Nth-level of feature flow estimators according to an exemplary embodiment of the disclosure, wherein N is greater than or equal to 2, and n is a positive integer number greater than or equal to 2 and less than or equal to N.
Figure 11:
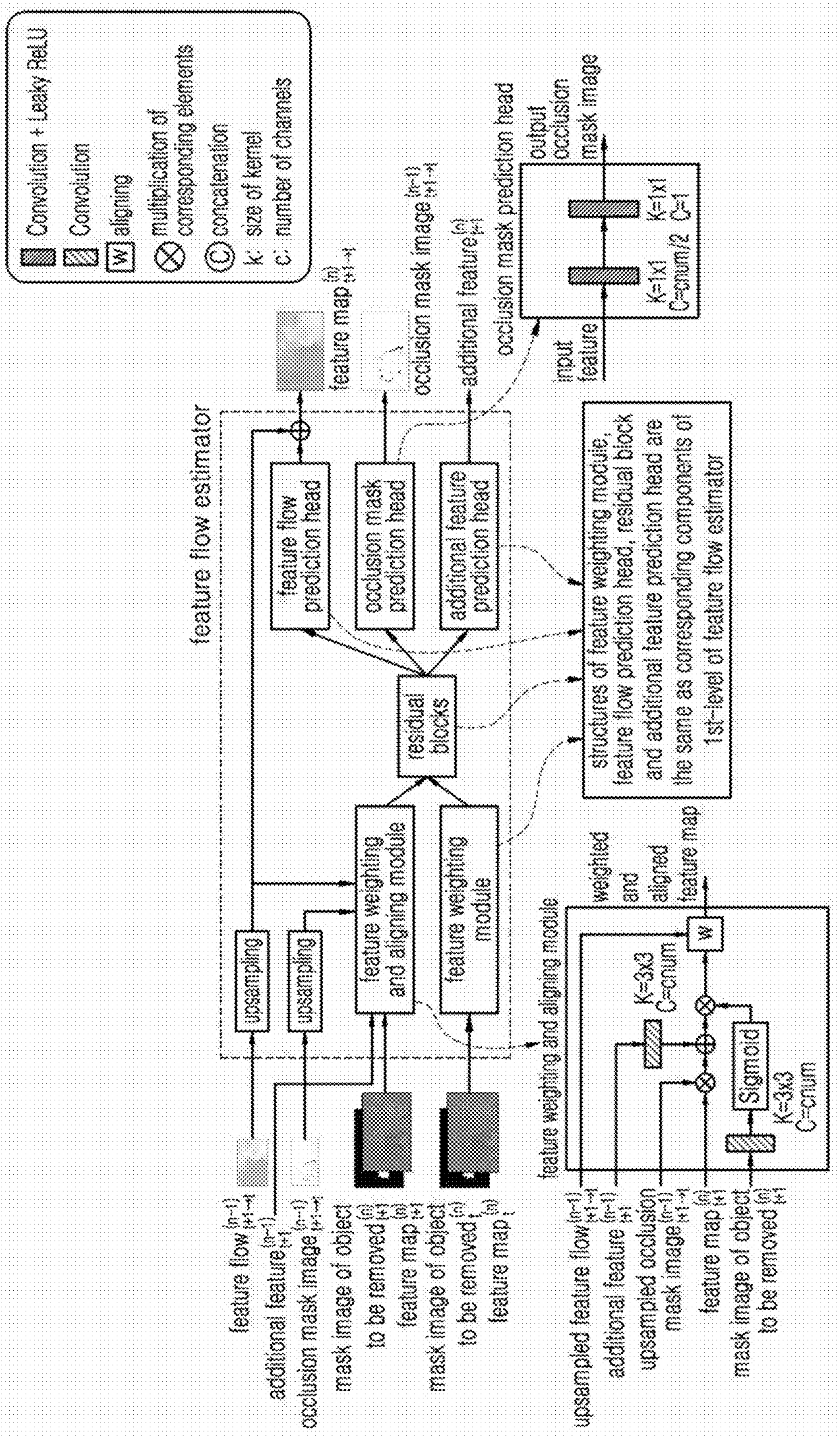
FIG. 11 illustrates each-level of in a second-level to an Nth-level of feature flow estimators according to an exemplary embodiment of the disclosure.

FIG. 10 is a flowchart showing the process of obtaining the feature flow and occlusion mask image by the nth-level of feature flow estimator in the 2nd to Nth levels of feature flow estimators according to an exemplary embodiment of the disclosure, wherein N is greater than or equal to 2, and n is a positive integer number greater than or equal to 2 and less than or equal to N. FIG. 11 is a schematic diagram showing a structure of each level of the 2nd to Nth levels of feature flow estimators according to an exemplary embodiment of the disclosure. Each level of feature flow estimator shown in FIG. 11 uses the mask image of the object to be removed and the occlusion mask image to weight its input feature map, and introduces the additional feature generated by the previous level of feature flow estimator to help refine the occlusion mask image, and may add additional information to the occlusion area so that the occlusion mask image may be predicted without a true value.

As shown in FIG. 10, in operation S1010, the (n−1)th-level of feature flow and the (n−1)th-level of occlusion mask image generated by the (n−1)th-level of feature flow estimator are upsampled, to obtain an upsampled feature flow and an upsampled occlusion mask image. As shown in FIG. 11, the feature $$\text{flow}_{t+1\to t}^{(n-1)}$$

and the occlusion mask $$\text{image}_{t+1}^{(n-1)}$$

from the (n−1)th-level of the (t+1)th frame image to the (n−1)th-level of the t-th frame image are upsampled, respectively, to obtain the upsampled feature flow and the upsampled occlusion mask image.

In operation S1020, an adjacent feature map corresponding to the adjacent frame image of the current frame image obtained from the (N−n)th downsampling is feature-weighted and aligned, based on the upsampled feature flow and the upsampled occlusion mask image, the (n−1)th-level of additional feature generated by the (n−1)th-level of feature flow estimator, and the mask image of the object to be removed corresponding to the adjacent frame image of the current frame image obtained from the (N−n)th downsampling, to obtain the weighted and aligned adjacent feature map.

This operation S1020 may include: weighting the adjacent feature map corresponding to the adjacent frame image of the current frame image, obtained from the (N-n)th downsampling by using the upsampled occlusion mask image, to obtain the weighted adjacent feature map; performing a convolution processing (the size K of the convolution kernel may be 3×3, the number of channel C of the convolution kernel may be Cnum) and a nonlinear-processing (such as, Sigmaid function) using an activation function, on the mask image of the object to be removed corresponding to the adjacent frame image of the current frame image, obtained from the (N−n)th downsampling, to obtain a nonlinear-processed mask image of the object to be removed; performing the convolution processing (the size K of the convolution kernel may be 3×3, the number of channel C of the convolution kernel may be Cnum) on the (n−1)th-level of additional feature generated by the (n−1)th-level of feature flow estimator, and obtaining an updated adjacent feature map based on a result of the convolution processing and the weighted adjacent feature map; weighting the updated adjacent feature map by using the nonlinear-processed mask image of the object to be removed, and performing an alignment processing on it by using the upsampled feature flow, to obtain the weighted and aligned adjacent feature map.

Specifically, as shown in FIG. 11, the (n−1)th-level of upsampled occlusion mask $$\text{image}_{t+1\to t}^{(n-1)}$$

generated by the (n−1)th-level of feature flow estimator is used to weight the (t+1)th frame feature map (i.e. feature $$\text{map}_{t+1}^{(n)})$$

input to the nth-level of feature flow estimator, to obtain the weighted (t+1)th frame feature map; a convolution layer, of which the size of convolution kernel is 3×3 and the number of channel C of the convolution kernel is cnum, is used to performs convolution processing on the (t+1)th frame mask image of the object to be removed (i.e. the mask image of the object to be $$\text{removed}_{t+1}^{(n)}$$

which is input to the nth-level of feature flow estimator) obtained from the (N−n)th downsampling, and the activation function such as Sigmaid is used to perform a nonlinear-processing on the convolution result to obtain the nonlinear-processed (t+1)th frame mask image of the object to be removed; a convolution layer, of which the size of convolution kernel is 3×3 and the number of channel C of the convolution kernel is cnum, is used to perform convolution processing on the (n−1)th-level of additional $$\text{feature}_{t+1}^{(n-1)}$$

generated by the (n−1)th-level of feature flow estimator, and adds the result of convolution processing with the weighted (t+1)th frame feature map, to obtain the updated (t+1)th frame feature map; the nonlinear-processed (t+1)th frame mask image of the object to be removed is used to perform weighting processing on the updated (t+1)th frame feature map, and finally the upsampled feature $$\text{flow}_{t+1\to t}^{(n-1)}$$

is used to perform aligning on the result of weighting processing to obtain the weighted and aligned (t+1)th frame feature map.

In operation S1030, the current feature map corresponding to the current frame image obtained from the (N−n)th downsampling is weighted based on the mask image of the object to be removed corresponding to the current frame image obtained from the (N−n)th downsampling, to obtain the weighted current feature image. As shown in FIG. 11, the t-th frame mask image of the object to be removed obtained from the (N−n)th downsampling (that is, the mask image of the object to be $$\text{removed}_t^{(n)}$$

which is input to the nth-level of feature flow estimator) is used to weight the t-th frame feature map obtained from the (N−n)th downsampling (that is, the feature $$\text{map}_t^{(n)}$$

input to the n-th level of feature flow estimator), to obtain the t-th frame weighted feature map. Since this process is the same as the feature weighting process described above with reference to FIG. 7, it will not be repeated here.

In operation S1040, a backward concatenation is performed on the weighted and aligned adjacent feature map and the weighted current feature map to obtain the back concatenation feature map. As shown in FIG. 11, the weighted t-th frame feature map is concatenated backward in front of the weighted and aligned (t+1)th frame feature map to obtain the backward concatenation feature map. In operation S1050, a plurality of residual blocks based on the residual network are used to encode the backward concatenation feature map. In operation S1060, feature flow prediction and occlusion mask prediction are performed based on the encoding result to obtain the nth level of feature flow and occlusion mask image from the adjacent frame image to the current frame image. Since the process of operation S1040, operation S1050, and part of operation S1060 (that is, the feature flow prediction is performed based on the encoding result to obtain the nth level of feature flow from adjacent frame image to the current frame image) is similar to the process described above with reference to FIG. 7 and operations S620, S630, and S640 in FIG. 6, this will not be repeated here.

Here, the process of obtaining the nth-level of occlusion mask image by performing occlusion mask prediction based on the encoding result in operation S1060 is different from the process of determining the occlusion mask image from the adjacent frame image to the current frame image through the consistency check process described above with reference to FIGS. 5, 6 and 7. As shown in FIG. 11, the n-th level of occlusion mask image (that is, the occlusion mask $$\text{image}_{t+1}^{(n)})$$

is obtained by using the occlusion mask prediction head, specifically, the encoding result generated by the plurality of residual blocks is processed by the two levels of "convolution+Leaky ReLU activation function" structure as shown in FIG. 11 (wherein the size K of the convolution kernel of the 1st-layer structure may be 1×1, the number of channels C may be cnum/2, and the size K of the convolution kernel of the 2nd-layer structure may be 1×1 and the number of channels C of the convolution kernel may be 1), and the nth-level of occlusion mask image (that is, the occlusion mask $$\text{image}_{t+1\to t}^{(n)})$$

from the adjacent frame image to the current frame image is finally output.

In addition, if N is greater than or equal to 3, when n is greater than or equal to 2 and less than or equal to N−1, for the nth-level of feature flow estimator, the coding result is also used for additional feature prediction to obtain the nth-level of additional feature. This process is the same as the process described above with reference to FIG. 7, and will not be repeated here. In other words, the last-level (i.e. the Nth-level) of feature flow estimator may not have the additional feature prediction head shown in FIG. 11.

So far, the feature flow and mask image from the adjacent frame image to the current frame image are finally obtained through the N levels of feature flow estimators, and in the same manner, the feature flow sequence of the current local frame sequence may be obtained.

Returning to FIG. 1, in operation S140, an updated feature map sequence of the current local frame sequence is obtained, by performing, based on the feature flow sequence, feature fusion between adjacent feature maps in the feature map sequence.

Specifically, after operation S130, the feature flow sequence and the occlusion mask image sequence of the current local frame sequence may be obtained. In this case, the obtaining the updated feature map sequence of the current local frame sequence includes: performing the feature fusion between adjacent feature maps in the feature map sequence based on the occlusion mask image sequence, the feature flow sequence and the mask image sequence of the object to be removed corresponding to the current local frame sequence, to obtain the updated feature map sequence of the current local frame sequence. This is described in detail below with reference to FIG. 12.

Figure 12:
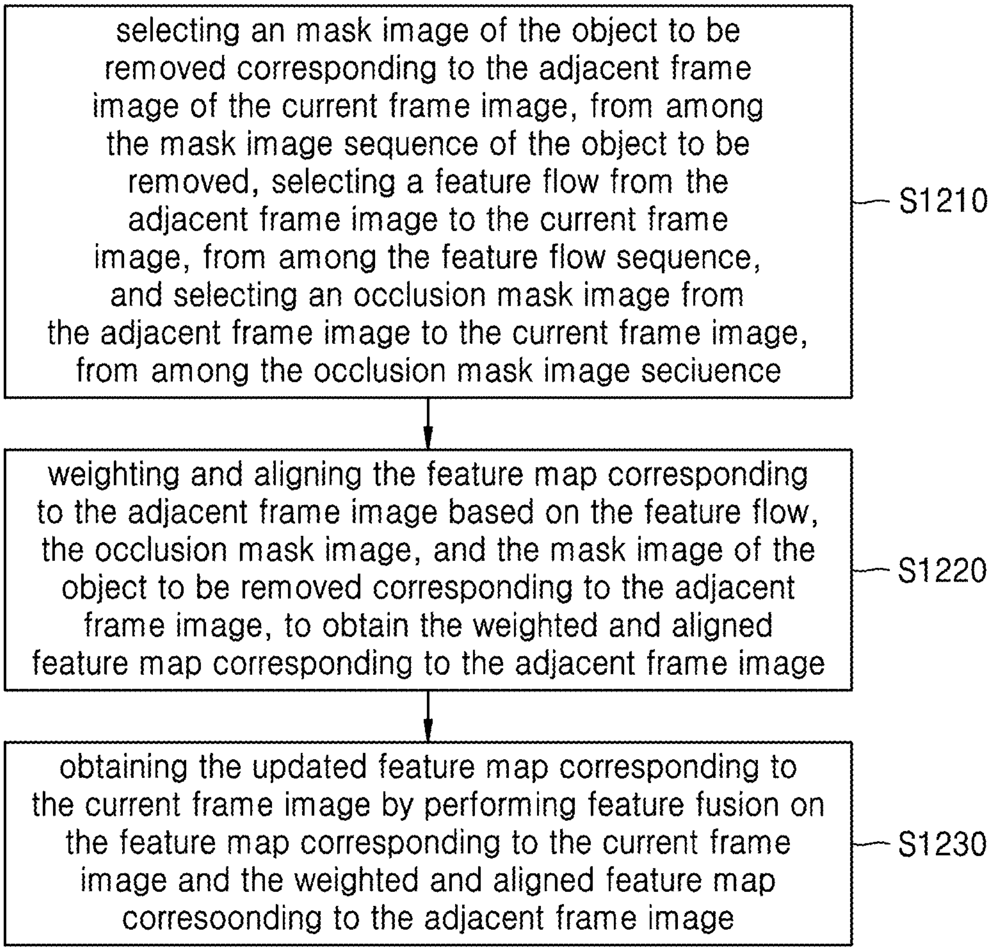
FIG. 12 illustrates a process of performing feature fusion between adjacent feature maps in a feature map sequence to obtain an updated feature map sequence of the current local frame sequence according to an exemplary embodiment of the disclosure.

FIG. 12 is a flowchart showing a process of performing feature fusion between adjacent feature maps in a feature map sequence to obtain an updated feature map sequence of the current local frame sequence according to an exemplary embodiment of the disclosure. The process described in FIG. 12 is to obtain the updated feature map for each frame image in the current local frame sequence.

In operation S1210, an mask image of the object to be removed corresponding to the adjacent frame image of the current frame image is selected, from among the mask image sequence of the object to be removed, a feature flow from the adjacent frame image to the current frame image is selected, from among the feature flow sequence, and an occlusion mask image from the adjacent frame image to the current frame image is selected, from among the occlusion mask image sequence.

In operation S1220, the feature map corresponding to the adjacent frame image of the current frame image is weighted and aligned based on the feature flow, the occlusion mask image, and the mask image of the object to be removed corresponding to the adjacent frame image of the current frame image, to obtain the weighted and aligned feature map corresponding to the adjacent frame image of the current frame image. This will be described below with reference to FIGS. 13 and 14.

Figure 13:
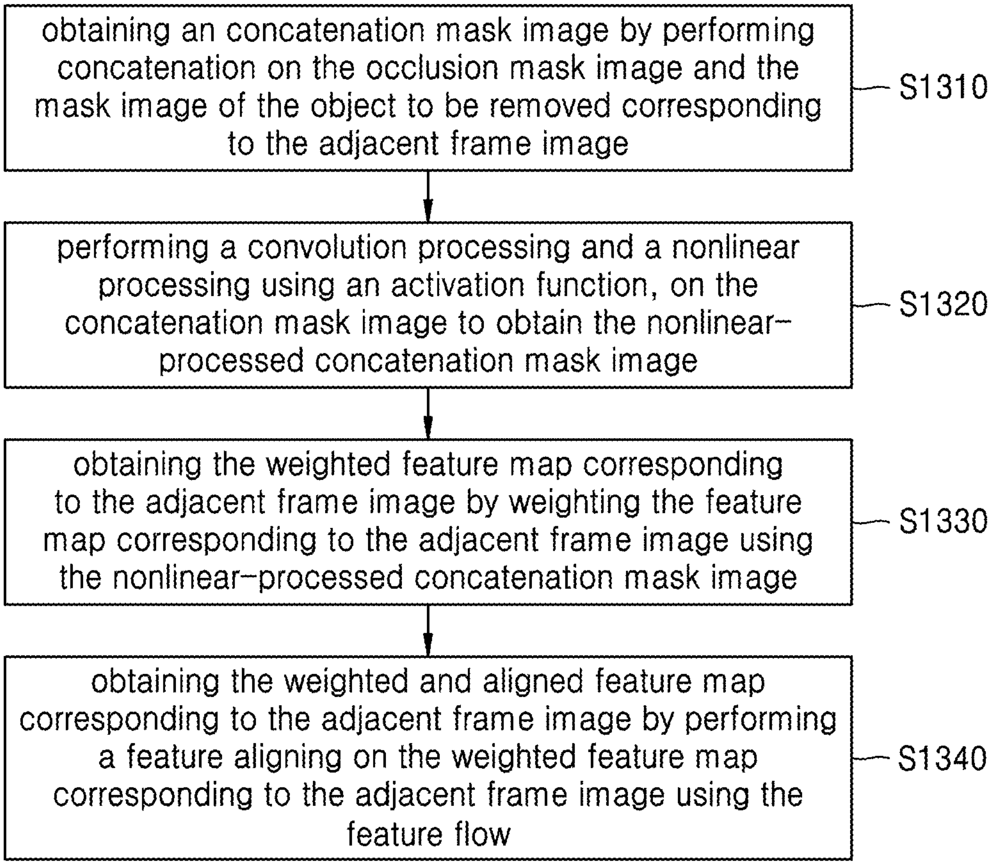
FIG. 13 illustrates a process of obtaining a weighted and aligned feature map corresponding to the adjacent frame image according to an exemplary embodiment of the disclosure.
Figure 14:
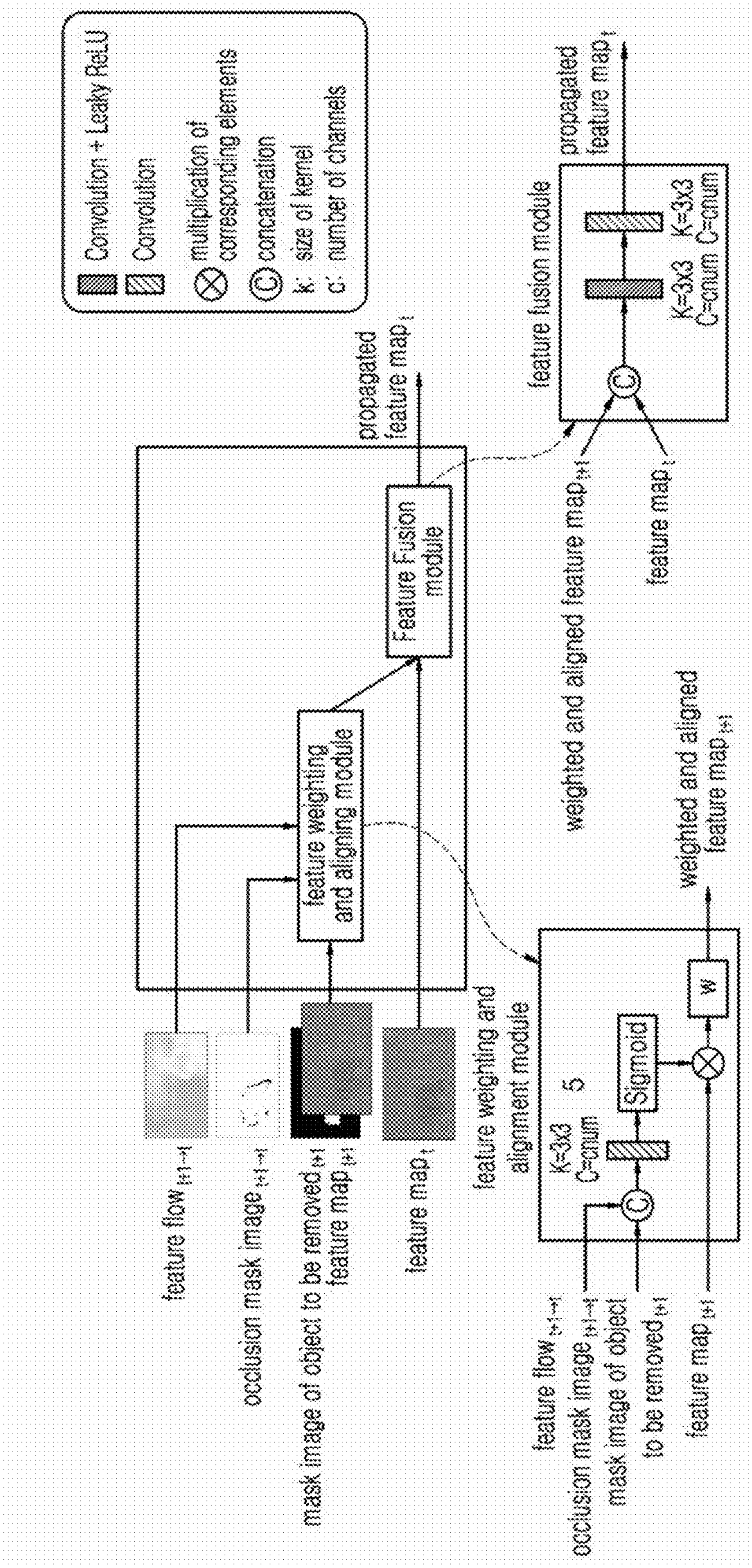
FIG. 14 illustrates a structure of a feature flow based feature aligning and propagation module according to an exemplary embodiment of the disclosure.

FIG. 13 is a flowchart showing a process of obtaining the weighted and aligned feature map corresponding to the adjacent frame image of the current frame image according to an exemplary embodiment of the disclosure. FIG. 14 is a schematic diagram showing a structure of a feature flow based feature aligning and propagation module according to an exemplary embodiment of the disclosure. The module may directly use the feature flow for feature aligning and then feature propagation, and may use the mask image of the object to be removed and the occlusion mask image to suppress propagation of unimportant features.

As shown in FIG. 13, in operation S1310, an concatenation mask image is obtained by performing concatenation on the occlusion mask image and the mask image of the object to be removed corresponding to the adjacent frame image of the current frame image. As shown in FIG. 14, the (t+1)th frame mask image of the object to be removed$_{t+1}$ is concatenated in front of the occlusion mask image$_{t+1\rightarrow t}$ from the (t+1)th frame image to the t-th frame image, to obtain the concatenation mask image.

In operation S1320, a convolution processing and a nonlinear-processing (by using an activation function) are performed on the concatenation mask image to obtain the nonlinear-processed concatenation mask image. As shown in FIG. 14, a convolution layer, of which the size of convolution kernel is 3×3 and the number of channel C of the convolution kernel is cnum, is used to perform the convolution processing on the concatenation mask image, and then the activation function such as Sigmaid is used to perform the nonlinear-processing on the result of convolution, to obtain the nonlinear-processed concatenation mask image.

In operation S1330, the weighted feature map corresponding to the adjacent frame image of the current frame image is obtained, by weighting the feature map corresponding to the adjacent frame image of the current frame image by using the nonlinear-processed concatenation mask image. As shown in FIG. 14, the weighted (t+1)th frame feature map$_{t+1}$ is obtained by weighting the (t+1)th frame feature map$_{t+1}$ using the nonlinear-processed concatenation mask image. Here, the occlusion mask image$_{t+1\rightarrow t}$ in the concatenation mask image is used to weight the (t+1)th frame feature map$_{t+1}$, which may help avoid ghosting in the occlusion area. In addition, the occlusion mask image$_{t+1\rightarrow t}$ in the concatenation mask image is used to weight the (t+1)th frame feature map$_{t+1}$, which may suppress defects caused by inaccurate feature flow of the area of the object to be removed in the alignment result.

In operation S1340, the weighted and aligned feature map corresponding to the adjacent frame image of the current frame image is obtained, by performing a feature aligning on the weighted feature map corresponding to the adjacent frame image of the current frame image by using the feature flow. As shown in FIG. 14, the feature flow$_{t+1\rightarrow t}$ is used to align the weighted (t+1)th frame feature map$_{t+1}$ to obtain the weighted and aligned (t+1)th frame feature map$_{t+1}$.

Returning to FIG. 12, in operation S1230, the updated feature map corresponding to the current frame image is obtained by performing feature fusion on the feature map corresponding to the current frame image and the weighted and aligned feature map corresponding to the adjacent frame image of the current frame image. As shown in FIG. 14, the t-th frame feature map$_t$ and the weighted and aligned (t+1)th frame feature map$_{t+1}$ is input into a feature fusion module for feature fusion to obtain the updated t-th frame feature map$_t$.

Specifically, the obtaining the updated feature map corresponding to the current frame image by performing feature fusion on the feature map corresponding to the current frame image and the weighted and aligned feature map corresponding to the adjacent frame image of the current frame image includes: performing concatenation on the feature map corresponding to the current frame image and the weighted and aligned feature map corresponding to the adjacent frame image of the current frame image, to obtain the concatenation feature map; performing a convolution processing on the concatenation feature map, to obtain the updated feature map corresponding to the current frame image. As shown in FIG. 14, firstly, the backward concatenation is performed by concatenating the t-th frame feature map$_t$ in front of the weighted and aligned (t+1)th frame feature map$_{t+1}$, to obtain the concatenation feature map, and then the "convolution+Leaky ReLU activation function" structure (wherein the size K of convolution kernel of the convolution layer may be 3×3, the number of channels C of the convolution kernel may be cnum) is used firstly to perform the convolution processing and the nonlinear-processing on the concatenation feature map, then, a convolution layer, of which the size K of convolution kernel is 3×3 and the number of channel C of the convolution kernel is cnum, is used to perform the convolution processing on a result of the nonlinear-processing, thereby finally obtaining the feature fused t-th frame feature map$_t$ (i.e., the feature image$_t$ after propagation), that is, the t-th frame feature map$_t$ that fuses the features in the (t+1)th frame feature map$_{t+1}$ is obtained.

So far, the t-th frame feature map after propagation as shown in FIG. 4 may be obtained, and each frame of the current local frame sequence is processed in turn until all frames in the current local frame sequence have been processed, so that feature map sequence of the current local frame sequence after propagation may be obtained. Since the feature flow based feature aligning and propagation module shown in FIG. 4 used in operations S120 and S130 does not adopt deformable convolution and directly uses the feature flow for feature aligning, the feature flow based feature aligning and propagation method/feature flow based feature aligning and propagation module may be deployed on a mobile terminal.

Returning to FIG. 1, in operation S150, a processed local frame sequence is obtained by decoding the updated feature map sequence of the current local frame sequence.

Specifically, contrary to the encoding process performed by the convolutional network encoder used in operation S120, the updated feature map sequence of the current local frame sequence may be input to the convolutional network decoder for decoding, to obtain a decoded current local frame sequence. Then, the mask area of the mask image in the mask image sequence may be used to crop the corresponding partial area from each frame of the decoded current local frame sequence, and then, the corresponding area of the corresponding frame in the original current local frame sequence may be replaced by the cropped corresponding partial area, so as to obtain the current local frame sequence after the object being removed or the missing area being completed.

In order to further improve an effect of object removal or completion of missing area, the method shown in FIG. 1 may also include, before operation S150, determining a reference frame sequence corresponding to each local frame sequence from the video. After encoding the reference frame sequence, the feature map sequence of the reference frame sequence may be obtained. The feature map sequence of this reference frame sequence may perform feature enhancement or feature completion on the feature map sequence of the corresponding current local frame sequence, and the decoded local frame sequence obtained by decoding the enhanced or completed feature map sequence of the current local frame sequence has higher quality than the decoded local frame sequence obtained in the previous operation S150. Hereinafter, the process of determining the reference frame sequence corresponding to each local frame sequence from the video will be described with reference to FIGS. 15 and 16.

Figure 15:
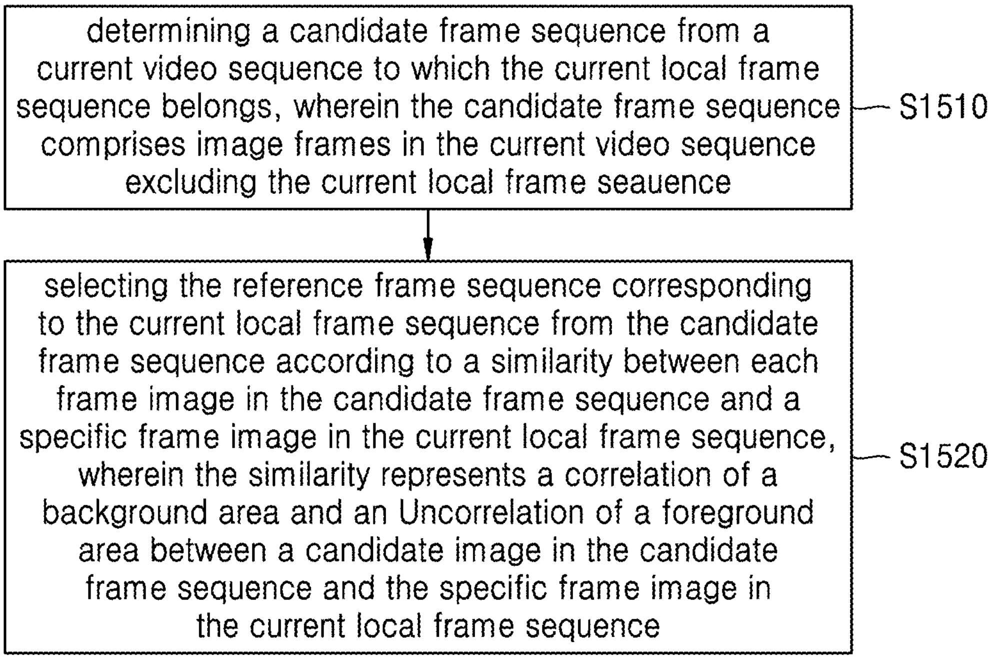
FIG. 15 illustrates a process of determining a reference frame sequence corresponding to each local frame sequence from a video according to an exemplary embodiment of the disclosure.
Figure 16:
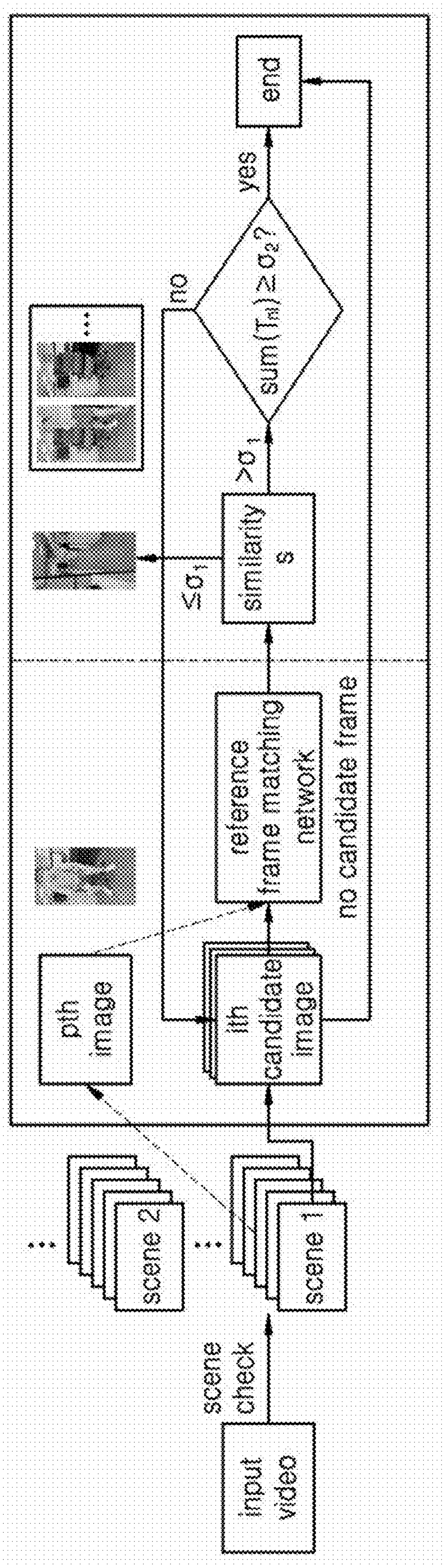
FIG. 16 illustrates an adaptive reference frame selection process according to an exemplary embodiment of the disclosure.

FIG. 15 is a flowchart showing a process of determining a reference frame sequence corresponding to each local frame sequence from a video according to an exemplary embodiment of the disclosure. FIG. 16 is a schematic diagram showing a structure of an adaptive reference frame selection module according to an exemplary embodiment of the disclosure. As shown in FIG. 2, after the input video is split based on the scene information to obtain at least one video sequence, for each local frame sequence, an appropriate reference frame sequence may be selected from among the video sequence with one scene to which the local frame sequence belongs. This is described in detail below.

In operation S1510, a candidate frame sequence is determined from a current video sequence to which the current local frame sequence belongs, wherein the candidate frame sequence comprises image frames in the current video sequence excluding the current local frame sequence.

Specifically, as shown in FIG. 16, it assumed that the current video sequence is a video sequence with scene 1, after a predetermined number of consecutive image frames are selected as the current local frame sequence from the current video sequence according to the operation S110 (for example, 10 consecutive image frames are selected as the current local frame sequence), all image frames in the current video sequence to which the current local frame sequence belongs, excluding the current local frame sequence are selected as the candidate frame sequence.

In operation S1520, the reference frame sequence corresponding to the current local frame sequence is selected from the candidate frame sequence according to a similarity between each frame image in the candidate frame sequence and a specific frame image in the current local frame sequence, wherein the similarity represents a correlation of a background area and an uncorrelation of a foreground area between a candidate image in the candidate frame sequence and the specific frame image in the current local frame sequence.

Specifically, as shown in FIG. 16, after the candidate frame sequence is determined from the current video sequence, a specific frame image in the current local frame sequence (for example, the pth frame image, wherein p may be 1) and each frame image in the candidate frame sequence (that is, the value of i in FIG. 16 is 1 to the total number I of frames in the candidate frame sequence) are input into a reference frame matching network, to obtain the similarity between the specific frame image in the current local frame sequence and each frame image in the candidate frame sequence, and then the reference frame sequence corresponding to the current local frame sequence is selected from the candidate frame sequence according to the similarity.

The selecting the reference frame sequence corresponding to the current local frame sequence from the candidate frame sequence according to the similarity between each frame candidate image in the candidate frame sequence and the specific frame image in the current local frame sequence includes: obtaining the similarity between a current candidate image in the candidate frame sequence and the specific frame image in the current local frame sequence by inputting the current candidate image and the specific frame image into a reference frame matching network; if the similarity between the current candidate image and the specific frame image is greater than a first threshold, selecting the current candidate image as a reference frame and determining whether a sum of similarities of all reference frames selected for the current local frame sequence is greater than a second threshold; if the sum of the similarities of all the reference frames selected for the current local frame sequence is greater than the second threshold, determining all the reference frames selected for the current local frame sequence as the reference frame sequence corresponding to the current local frame sequence. Based on a frame order, the above operations are performed on each frame candidate image in the candidate frame sequence.

As shown in FIG. 16, after the ith frame candidate image in the candidate frame sequence and the specific frame image in the current local frame sequence (such as the pth frame image) are input into the reference frame matching network to obtain the similarity s between the ith frame candidate image and the specific frame image, it is necessary to determine whether the similarity s is greater than the first threshold $\sigma_1$, if the similarity s is less than or equal to the first threshold $\sigma_1$, it means that the ith frame candidate image may not provide effective supplementary information for the specific area (such as, missing area) of the specific frame image in the current local frame sequence, so the ith frame candidate image is discarded instead of being selected as the reference frame, and then it returns to continue iteration, that is, whether the next candidate image in the candidate frame sequence may be used as the reference frame of the current local frame sequence is determined according to a frame order. If the similarity s is greater than the first threshold $\sigma_1$, the current ith frame candidate image is selected as the reference frame, for example, it is added to a list $T_{nl}$, and then the sum of similarities of all reference frames in this list $T_{nl}$ is calculated, that is, the sum of similarities of all reference frames selected with respect to the current local frame sequence is calculated, and whether the sum of similarities is greater than the second threshold $\sigma_2$ value is determined. If the sum of the similarities is less than the second threshold $\sigma_2$ value, returning to continue iteration, that is, whether the next candidate image in the candidate frame sequence may be used as the reference frame of the current local frame sequence is determined according to the frame order, if the sum of the similarities is greater than or equal to the second threshold $\sigma_2$ value, the loop is ended, and all reference frames in the list $T_{nl}$ are determined as the reference frame sequence of the current local frame sequence, that is, all reference frames selected with respect to the current local frame sequence are determined as the reference frame sequence. The reference frame sequence selected according to the above method is a high-quality reference frame sequence.

The process of obtaining the similarity between the candidate image in the candidate frame sequence and the specific frame image in the current local frame sequence using the reference frame matching network is described in detail below with reference to FIGS. 17 and 18.

Figure 17:
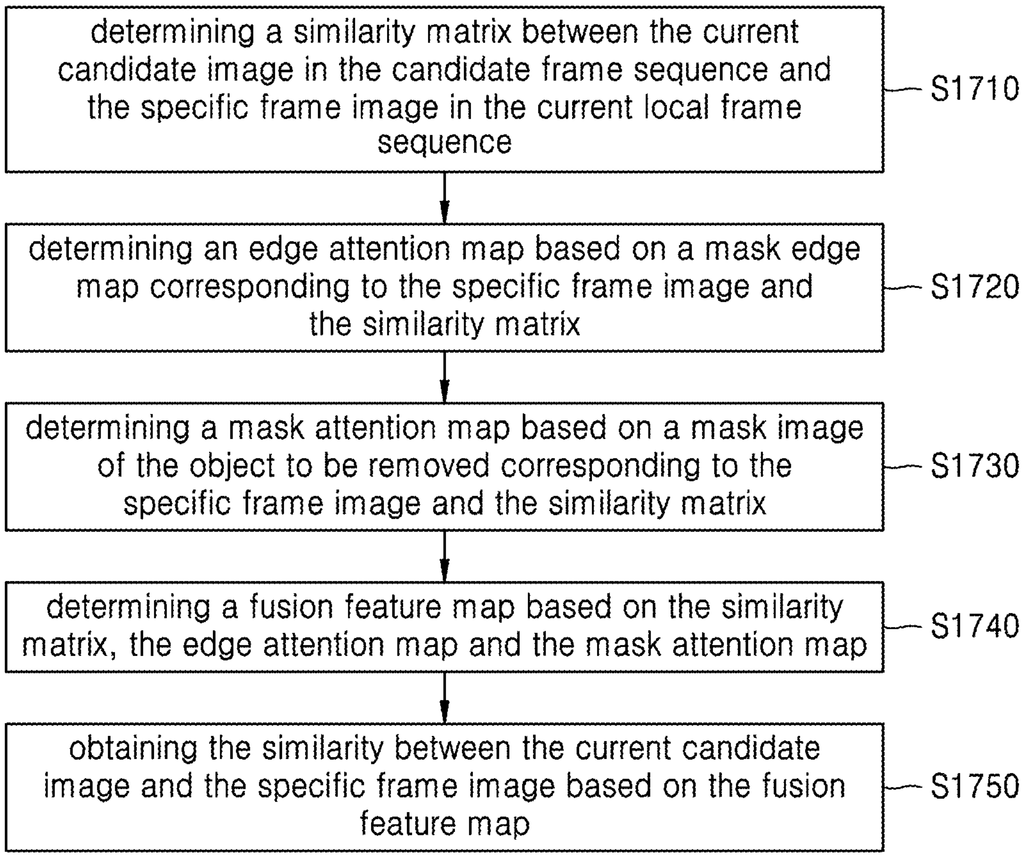
FIG. 17 illustrates a process of obtaining a similarity between a candidate image in a candidate sequence and a specific frame image in a current local frame sequence using a reference frame matching network according to an exemplary embodiment of the disclosure.

FIG. 17 is a flowchart showing a process of obtaining a similarity between a candidate image in a candidate sequence and a specific frame image in a current local frame sequence using a reference frame matching network according to an exemplary embodiment of the disclosure. FIG. 18 shows a structural diagram of a reference frame matching network according to an exemplary embodiment of the disclosure, wherein the reference frame matching network may include a feature encoding module, an edge attention map module, a mask attention map module, and a fusion output module.

In operation S1710, a similarity matrix between the current candidate image in the candidate frame sequence and the specific frame image in the current local frame sequence is determined. Specifically, this operation may include: by concatenating and encoding the current candidate image in the candidate frame sequence and the specific frame image in the current local frame sequence, obtaining the similarity matrix between the current candidate image and the specific frame image.

Figure 18:
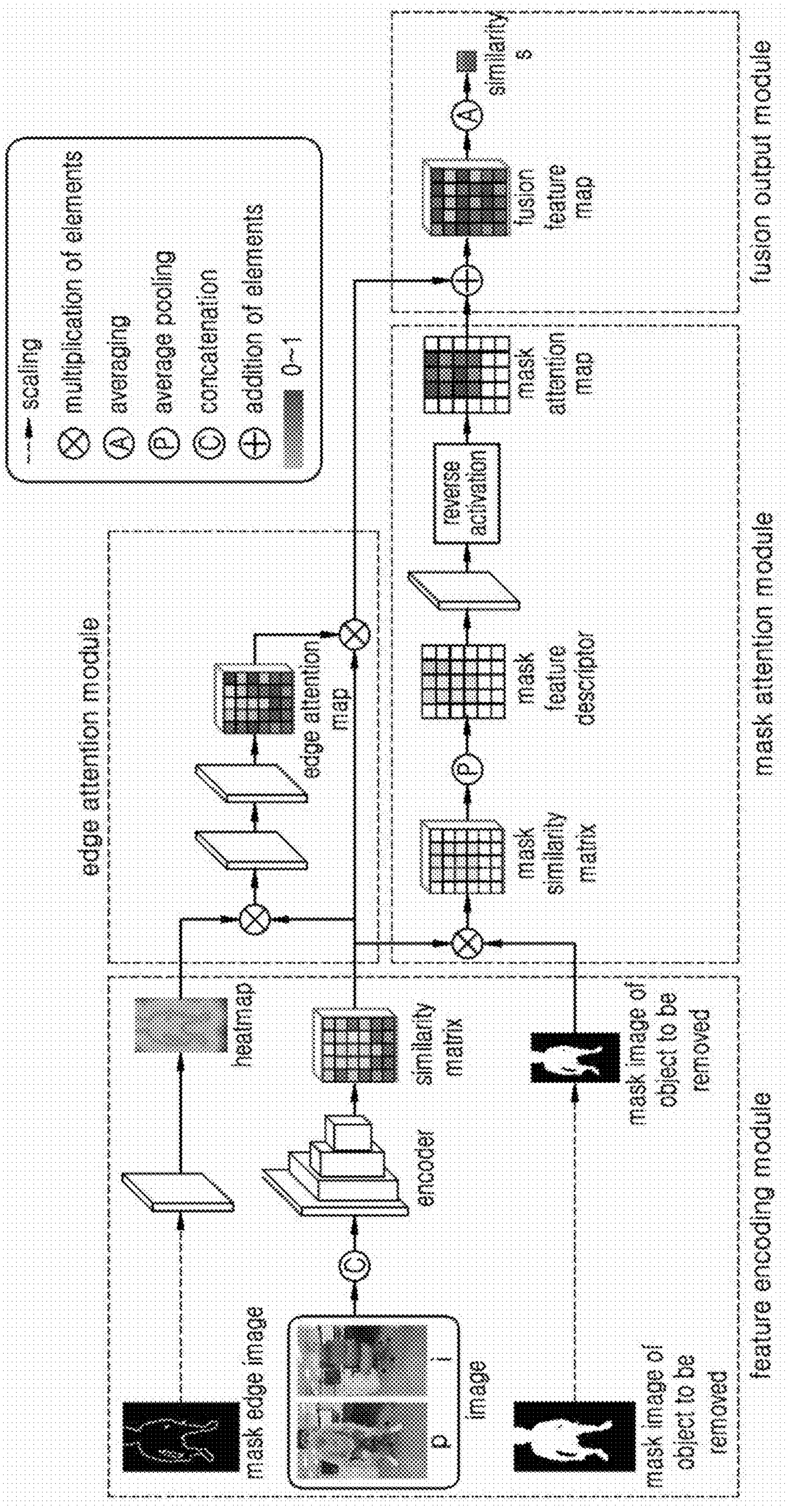
FIG. 18 illustrates a structural diagram of a reference frame matching network according to an exemplary embodiment of the disclosure.

As shown in FIG. 18, in the feature encoding module, firstly, the current ith frame candidate image is concatenated with the pth frame image (that is, the specific frame image) in the current local frame sequence (for example, their rgb images are concatenated), and then a result of the concatenation is input to a convolutional network encoder for encoding, to obtain the similarity matrix between the ith frame candidate image and the specific frame image.

In operation S1720, an edge attention map is determined based on a mask edge map corresponding to the specific frame image and the similarity matrix. This operation may include: obtaining a heatmap of the mask edge map by convoluting the mask edge map; obtaining the edge attention map based on the heatmap and the similarity matrix.

As shown in FIG. 18, firstly, in the feature encoding module, the mask edge map is convolved through a convolution layer, to convert the mask edge map into the heatmap. Alternatively, this operation may also be performed by the edge attention map module. Then, in the edge attention map module, the heatmap and the similarity matrix obtained in operation S1710 are multiplied, and then a result of the multiplication is convolved through two layers of convolution layers, to finally obtain the edge attention map.

In operation S1730, a mask attention map is determined based on a mask image of the object to be removed corresponding to the specific frame image and the similarity matrix. This operation may include: obtaining a mask similarity matrix based on the mask image of the object to be removed and the similarity matrix; obtaining a mask area feature descriptor based on the mask similarity matrix; obtaining the mask attention map based on the mask area feature descriptor. For example, a 'feature descriptor' is a method that extracts feature descriptions for an interest point (or the full image). Feature descriptors serve as a kind of numerical 'fingerprint' that may be used to distinguish one feature from another by encoding interesting information into a string of numbers.

As shown in FIG. 18, firstly, in the feature encoding module, the mask image of the object to be removed with a size of this feature frame image, corresponding to the feature frame image in the current local frame sequence, is scaled to the same size as the similarity matrix obtained in operation S1710. Alternatively, this operation may also be performed by the mask attention module. Then, in the mask attention module, the scaled mask image of the object to be removed is multiplied with this similarity matrix to obtain the mask similarity matrix, wherein the mask similarity matrix is a similarity matrix with only a mask area. Thereafter, an average pooling layer is used to convert the mask similarity matrix into the mask area feature descriptor, then the convolution processing and the nonlinear-processing is performed on the mask area feature descriptor through a convolution layer and a reverse activation function (for example, 1-sigmoid) in sequence, thus converting the mask area feature descriptor into the normalized spatial attention map (i.e., mask attention map). Here, the reverse activation function may convert the foreground uncorrelation value into an attention map with the same distribution as the background correlation value.

In operation S1740, a fusion feature map is determined based on the similarity matrix, the edge attention map and the mask attention map. This operation may include: determining the fusion feature map, by multiplying the edge attention map and the similarity matrix and adding a result of the multiplication with the mask attention map.

In operation S1750, the similarity between the current candidate image and the specific frame image is obtained based on the fusion feature map.

As shown in FIG. 18, firstly, in the edge attention module, the edge attention map is multiplied by the similarity matrix. Alternatively, this process may also be performed by the fusion output module. Then, in the fusion output module, the result of the multiplication is directly added to the mask attention map according to each element, to obtain the fusion feature map, and then all the feature values in the fusion feature map are arithmetically averaged, to obtain a similarity s between the current candidate image and the specific frame image, this similarity s may be used to represent a correlation of a background area and an uncorrelation of a foreground area between the current candidate image and the specific frame image in the current local frame sequence, and the similarity s is not sensitive to the size of the mask area. In addition, the value range of each exemplary grid of the similarity matrix, edge attention map, mask similarity matrix, mask feature descriptor, mask attention map and fusion feature map shown in FIG. 18 is 0~1, and the similarity s is also a value within 0~1. However, this is exemplary. They may be values in other ranges with the same standard.

An adaptive reference frame selection method proposed in the disclosure is described above with reference to FIGS. 15 to 18. This method uses the reference frame matching network to obtain the similarity that may represent the correlation of the background area and the uncorrelation of the foreground area between two frames of images, and then filters the candidate frames by using two thresholds, which may also reduce the number of reference frames in the reference frame sequence while selecting an appropriate reference frame sequence, which may not only ensure the effect of video processing such as object removal and completion of the missing area, but also improve the processing speed of video object removal and completion of the missing area.

So far, according to the above described process, the reference frame sequence corresponding to each local frame sequence may be determined from the video, and then the reference frame sequence can be used to perform the feature enhancement or feature completion on the corresponding local frame sequence. Therefore, the method may also include: by encoding the reference frame sequence corresponding to each local frame sequence, obtaining a feature map sequence of the reference frame sequence. Specifically, the reference frame sequence may be encoded by using the convolutional network encoder adopted in operation S120 above to obtain the feature map sequence of the reference frame sequence.

On this basis, the decoding the updated feature map sequence of the current local frame sequence in operation S150 may include: performing feature enhancement or feature completion on the updated feature map sequence of the current local frame sequence by using the feature map sequence of the reference frame sequence of the current local frame sequence, to obtain the enhanced or completed feature map sequence of the current local frame sequence.

Specifically, feature enhancement and/or feature completion operations are performed on the updated feature map sequence of the current local frame sequence by using the feature map sequence of the reference frame sequence through a Transformer module. However, the disclosure is not limited to this. The feature enhancement and/or feature completion operations may be performed on the updated feature map sequence of the current local frame sequence by using the feature map sequence of the reference frame sequence through a PoolFormer module. Compared with the Transformer module, in the PoolFormer module, a multi-head attention layer in the Transformer module is replaced by a pooling layer, thus realizing a lightweight of modules while maintaining a performance, so that the video processing method proposed in the disclosure may be more easily deployed on the mobile terminal. Here, when a content to be completed in the video is not completed after operations S110 to S140 due to a video content, the updated feature map sequence of the current local frame sequence may be completed by using the feature map sequence of the reference frame sequence through the Transformer module or PoolFormer module. In addition, even if the content to be completed in the video is completed after operations S110 to S140, the Transformer module or PoolFormer module may still use the feature map sequence of the reference frame sequence to enhance features of the updated feature map sequence of the current local frame sequence, further improving the effect of video processing.

Then, the decoding the updated feature map sequence of the current local frame sequence (in operation S150) may also include: performing the decoding processing of the enhanced or completed feature map sequence of the current local frame sequence, that is, the enhanced or completed feature map sequence of the current local frame sequence may be input to a convolutional network decoder for decoding, to obtain the decoded current local frame sequence. Then, the mask area of the mask image in the mask image sequence may be used to crop a corresponding partial area from each frame of the decoded current local frame sequence, and then, a corresponding area of the corresponding frame in the original current local frame sequence may be replaced by the cropped corresponding partial area, so as to obtain the current local frame sequence after the object being removed or the missing area being completed.

In addition, from the above replacement process (that is, the process of replacing the corresponding area of the corresponding frame in the original current local frame sequence by the cropped corresponding partial area), it may be found that, in the decoding stage, only a feature area associated with the mask area is useful for a final completion of the resulting image, while a calculation of the features of other areas except the mask area in the decoding stage is redundant, therefore, in order to further reduce the redundant calculation in the decoding stage, the disclosure proposes a feature cropping method without information loss. This will be described below with reference to FIG. 19 and FIG. 20.

Figure 19:
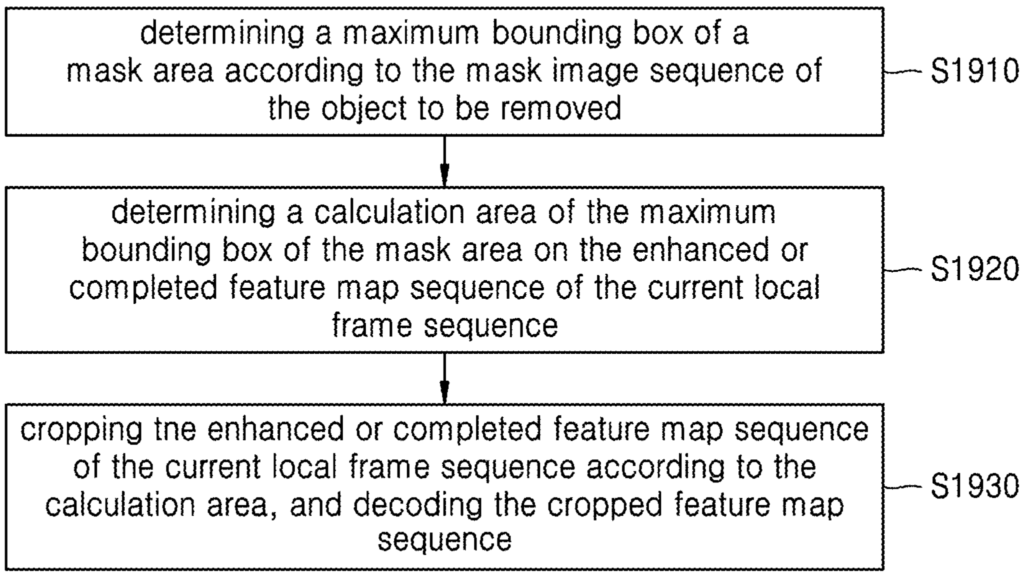
FIG. 19 illustrates a process of performing a decoding processing based on an enhanced or completed feature map sequence of a current local frame sequence according to the exemplary embodiment of the disclosure.
Figure 20:
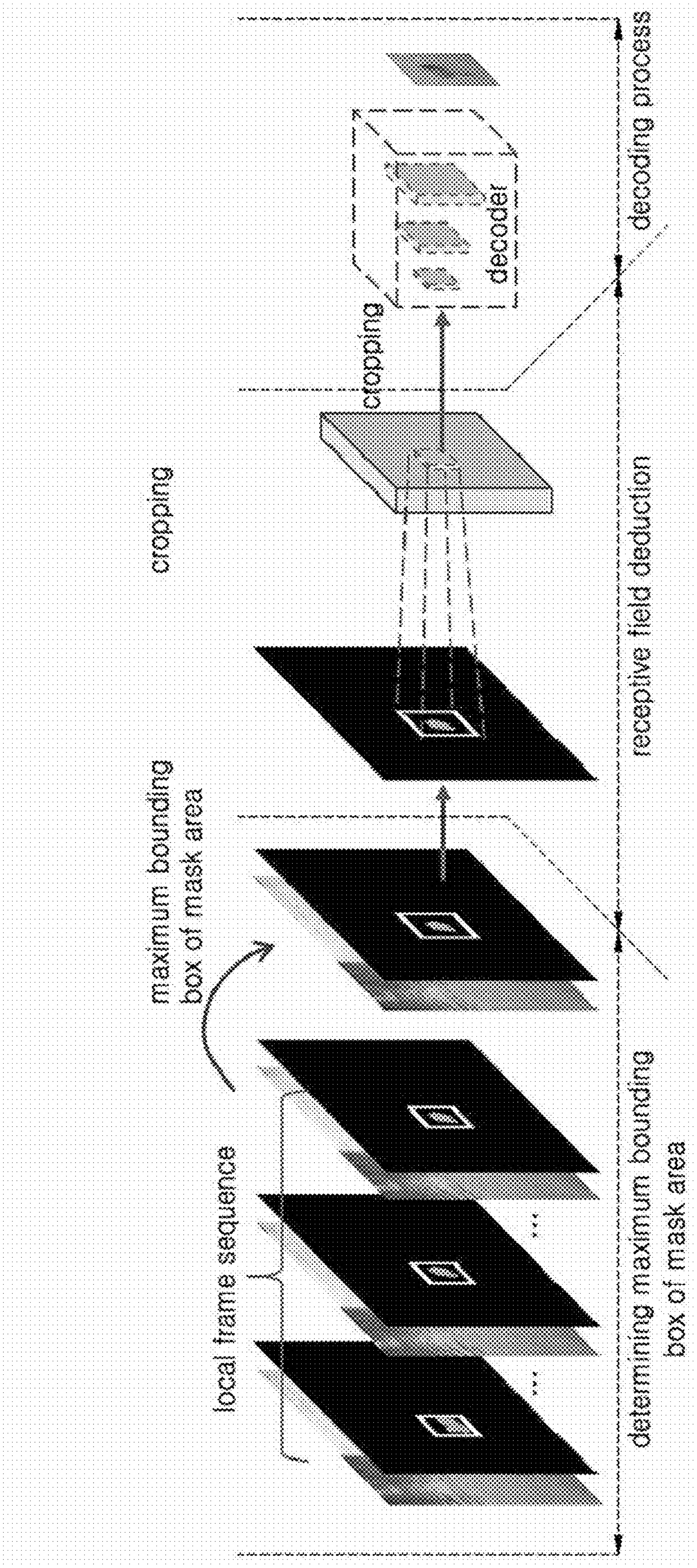
FIG. 20 illustrates a process of a feature cropping module without information loss according to an exemplary embodiment of the disclosure.

FIG. 19 is a flowchart showing a process of performing a decoding processing based on an enhanced or completed feature map sequence of a current local frame sequence according to the exemplary embodiment of the disclosure. FIG. 20 is a schematic diagram showing a process of a feature cropping module without information loss according to an exemplary embodiment of the disclosure.

As shown in FIG. 19, in operation S1910, a maximum bounding box of a mask area is determined according to the mask image sequence of the object to be removed.

Specifically, because each dynamic change of the resolution of the input image will lead to the loss of additional model loading time when a depth learning module performs reasoning on the mobile terminal, the disclosure, in order to reduce the loss of time, determines a maximum bounding box of the mask area according to the mask image sequence corresponding to the object to be removed, for the current local frame sequence, thus overcoming the additional model loading time loss caused by the dynamic change of the resolution of the input image. As shown in FIG. 20, firstly, a bounding box of the mask area of each mask image of the object to be removed in the mask image sequence of the object to be removed (such as, a white box on each mask image of the object to be removed in FIG. 20) is determined, and then, the maximum bounding box of the mask area is determined using the following equation (2), according to a height and a width of the bounding box of the mask area of each mask image of the object to be removed.

$$\text{Input}(h, w) = (\max(h_1, h_2 \ldots h_m), \max(w_1, w_2 \ldots w_m)) \tag{2}$$

Wherein, m represents the number of the mask images of the object to be removed in the mask image sequence of the object to be removed, $h_1, h_2 \ldots h_m$ represents the height of the bounding box of the mask area of the mask image of the object to be removed 1, the mask image of the object to be removed 2, . . . , the mask image of the object to be removed m, and $w_1, w_2 \ldots w_m$ represents the width of the bounding box of the mask area of the mask image of the object to be removed 1, the mask image of the object to be removed 2, . . . the mask image of the object to be removed m, respectively, Input (h, w) represents the maximum bounding box of the mask area, wherein h and w represent the height and width of the maximum bounding box of the mask area.

In operation S1920, a calculation area of the maximum bounding box of the mask area on the enhanced or completed feature map sequence of the current local frame sequence is determined.

Figure 21:
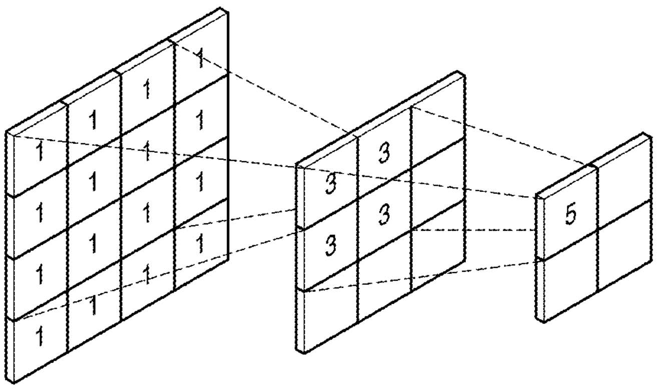
FIG. 21 illustrates a process of calculating a receptive field of a decoder.

Specifically, as shown in FIG. 21, because in a convolutional network structure, different layers have receptive fields of different sizes, and for tasks such as object removal and completion of the missing area, only the decoding result of the mask area is actually valid, therefore, in operation S1920, a receptive field of the decoder for subsequent decoding operations is firstly calculated, specifically, the disclosure may calculate the receptive field of the decoder according to the following equation (3):

$$l_k = l_{k-1} + \left((f_k - 1) * \prod_{i=1}^{k-1} s_i\right) \quad (3)$$

Wherein, k represents the kth-layer network of the decoder, f represents a convolution kernel of each layer, and s represents a stride of each layer when convolution is performed. Therefore, it is assumed that the decoder used in the subsequent decoding operations of the disclosure is consists of two upsamplings and a convolution layer with two convolution kernels of 3×3. Therefore, for an output layer of the decoder, the receptive field of the input layer may be calculated as:

$$\begin{aligned} l_0 &= 1 \quad (4) \\ l_1 &= 1 + (3 - 1) = 3 \\ l_2 &= 3 + (2 - 1) * 1 = 4 \\ l_3 &= 4 + (3 - 1) * 1 * 2 = 8 \\ l_4 &= 8 + (2 - 1) * 1 * 2 * 1 = 10 \end{aligned}$$

According to equation (4) above, each receptive field of the decoder may be deduced.

Then, the maximum bounding box of the mask area is scaled according to a resolution ratio between the enhanced or completed feature map sequence and an original feature map sequence of the current local frame sequence. Since the feature map sequence subsequently input into the decoder has been downsampled in the previous process, in order to make the maximum bounding box of the mask area at this time correspond to the resolution of the feature map sequence at the current stage (that is, the enhanced or completed feature map sequence), it is necessary to scale the maximum bounding box of the mask area according to the resolution ratio between the enhanced or completed feature map sequence and the original feature map sequence of the current local frame sequence, for example, reducing the maximum bounding box of the mask area by a quarter.

Then, the scaled maximum bounding box of the mask area is expanded according to the receptive field, to obtain the calculation area. Specifically, the top, bottom, left and right of the scaled maximum bounding box of the mask area are expanded outwards by (receptive field/2) pixels according to the calculated receptive field, for example, it is assumed that the decoder used in the disclosure is composed of two upsamplings and a convolution layer with two convolution kernels of 3×3, therefore, as shown in equation (4) above, the receptive field of the decoder is $l_4=10$. Accordingly, after the maximum bounding box of the mask area is scaled, the top, bottom, left and right of the scaled maximum bounding box of the mask area are expanded outwards by $l_4/2$ pixels, that is, 5 pixels, to obtain the calculation area of the maximum bounding box of the mask area on the enhanced or completed feature map of the current local frame sequence.

In operation S1930, the enhanced or completed feature map sequence of the current local frame sequence is cropped according to the calculation area, and the cropped feature map sequence is decoded.

As shown in FIG. 20, the enhanced or completed feature map sequence is cropped according to the calculation area to obtain the cropped area sequence, and then the cropped area sequence is input to the decoder for decoding, to obtain a decoding result of the cropped area sequence. In conclusion, the feature cropping method without information loss proposed by the disclosure may greatly reduce feature data to be decoded, so the video processing speed of the mobile terminal may be greatly improved on the premise of ensuring the unchanged final video processing effect (such as, an effect of object removal, an effect of completion of the missing area).

After the decoding result of the cropped area sequence is obtained according to the process described in FIG. 19, the current local frame sequence may be modified using the decoding result.

Specifically, since the decoding result of the cropped area sequence is a decoded image area sequence corresponding to the maximum bounding box of the mask area, the corresponding area in the local frames may be replaced by the decoded image area of each local frame in the decoding result, according to the size and position of the maximum bounding box of the mask area.

The feature cropping method without information loss described above may reduce the redundant calculation in the decoding stage, greatly improve the video processing speed of the mobile terminal on the premise of ensuring the unchanged final video processing effect (such as, an effect of object removal), thereby making the method proposed in the disclosure have a faster reasoning speed when deployed to the mobile terminal.

Figure 22:
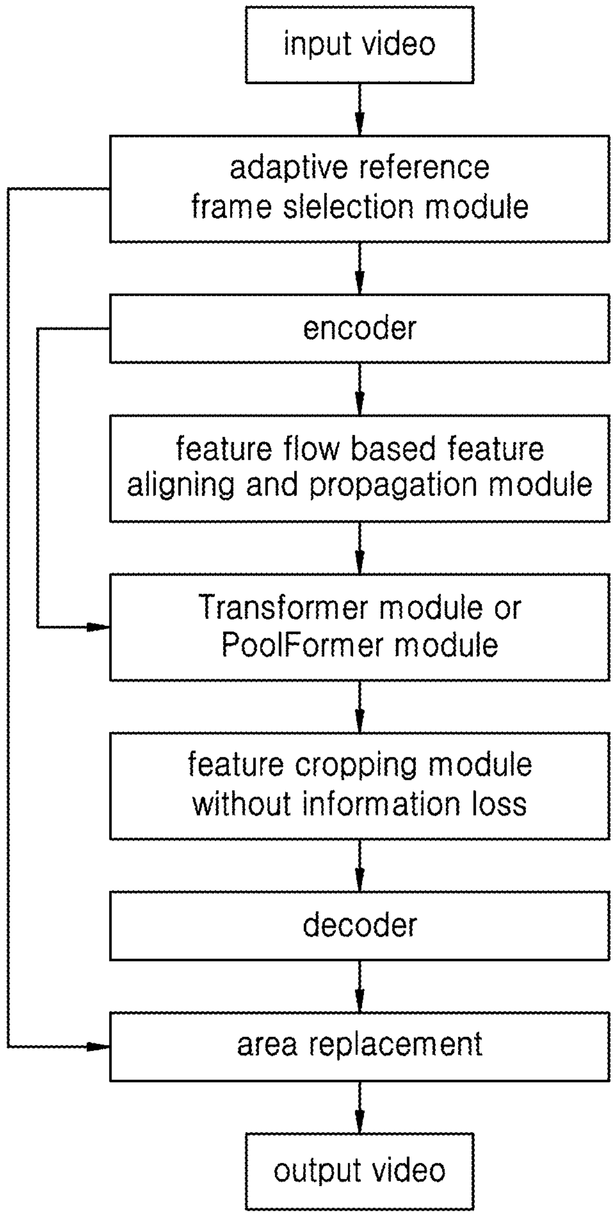
FIG. 22 illustrates a method executed by an electronic apparatus as shown in FIG. 1 according to an exemplary embodiment of the disclosure.

FIG. 22 is a general process showing a method executed by an electronic apparatus as shown in FIG. 1 according to an exemplary embodiment of the disclosure. In order to facilitate the understanding of the disclosure, a general description of the method performed by electronic apparatus proposed in the disclosure is given below with reference to FIG. 22. The arrows shown in FIG. 22 are only used to indicate that there is data flow between different processing modules or different operations.

Firstly, a video is scene split according to scene information to obtain at least one video sequence, and then at least one local frame sequence is determined from the split at least one video sequence. Then, as shown in FIG. 22, the following operations are performed for each local frame sequence:

A current local frame sequence and other frames in a current video sequence to which it belongs are input to an adaptive reference frame selection module, which, for the current local frame sequence, selects a reference frame sequence from a candidate frame sequence in the current video sequence excluding the current local frame sequence according to a similarity;

The current local frame sequence and its reference frame sequence are input to an encoder (such as, a convolutional network encoder) for encoding, to obtain a feature map sequence of the current local frame sequence and a feature map sequence of the reference frame sequence;

Based on a feature aligning and propagation module, a feature flow sequence of the current local frame sequence is determined using the feature map sequence of the current local frame sequence and the mask image sequence corresponding to the object to be removed, and then feature fusion is performed between adjacent feature maps in the feature map sequence of the current local frame sequence based on the feature flow sequence to obtain the updated feature map sequence of the current local frame sequence;

The feature enhancement or feature completion operations are performed on the updated feature map sequence of the current local frame sequence by using the feature map sequence of the reference frame sequence output by the encoder through a PoolFormer module or Transformer module, to obtain the enhanced or completed feature map sequence of the current local frame sequence;

Each feature map in the enhanced or completed feature map sequence is cropped using a maximum bounding box of object mask determined based on the mask image sequence of the object to be removed, through a feature cropping module without information loss.

The decoder is used to decode the cropped feature map sequence to obtain the image area corresponding to the maximum bounding box of the object mask for each local frame in the current local frame sequence.

Finally, the corresponding local frame in the current local frame sequence is replaced by each decoded image area corresponding to the maximum bounding box of the object mask, thereby realizing operations such as object removal in specific areas and completion of the missing area.

Figure 23:
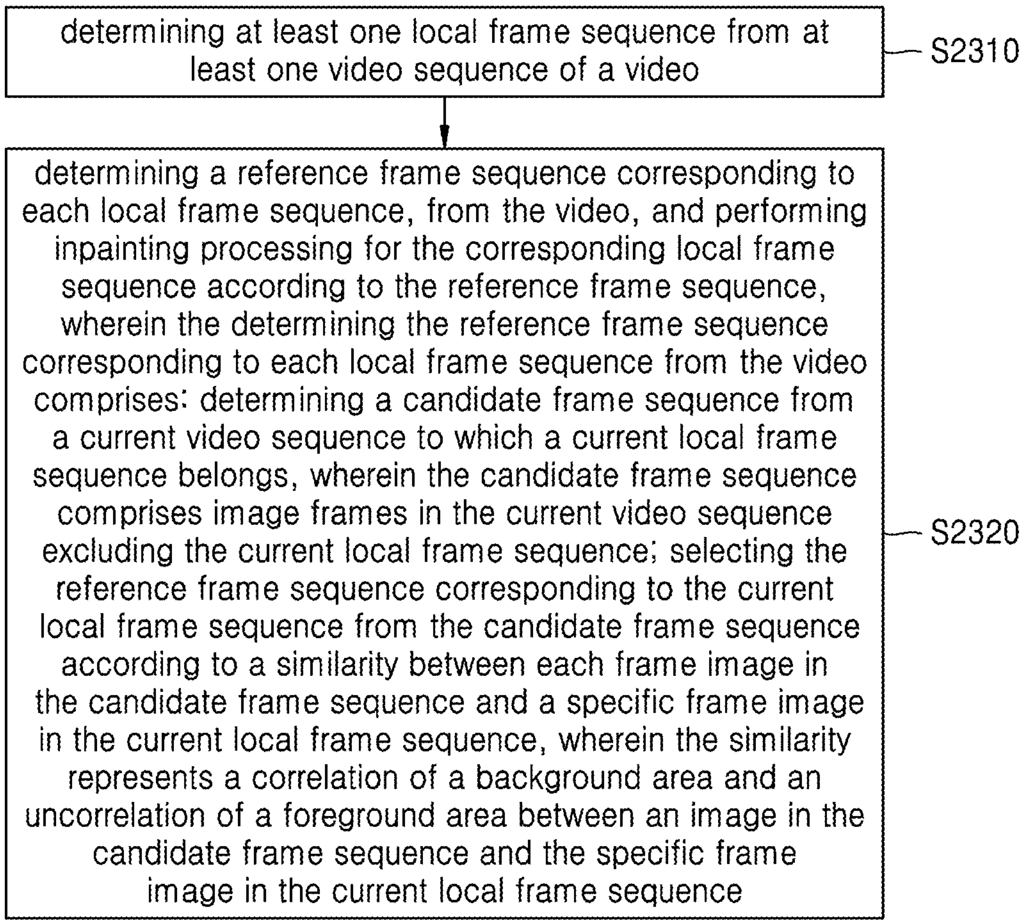
FIG. 23 illustrates a method performed by an electronic apparatus according to another exemplary embodiment of the disclosure.

FIG. 23 is a flowchart showing a method performed by an electronic apparatus according to another exemplary embodiment of the disclosure.

As shown in FIG. 23, in operation S2310, at least one local frame sequence is determined from at least one video sequence of a video. This process is the same as that of operation S110 in FIG. 1 above, so it will not be repeated here.

In operation S2320, a reference frame sequence corresponding to each local frame sequence, is determined from the video, and an inpainting processing is performed for the corresponding local frame sequence according to the reference frame sequence.

The determining the reference frame sequence corresponding to each local frame sequence from the video includes: determining a candidate frame sequence from a current video sequence to which a current local frame sequence belongs, wherein the candidate frame sequence comprises image frames in the current video sequence excluding the current local frame sequence; selecting the reference frame sequence corresponding to the current local frame sequence from the candidate frame sequence according to a similarity between each frame image in the candidate frame sequence and a specific frame image in the current local frame sequence, wherein the similarity represents a correlation of a background area and an uncorrelation of a foreground area between an image in the candidate frame sequence and the specific frame image in the current local frame sequence. Since the above process is the same as that in FIG. 15 above, this will not be repeated here.

Thereafter, after the reference frame sequence is selected, the current local frame sequence is inpainted according to the reference frame sequence. For example, a convolutional network encoder may be used to encode the reference frame sequence to obtain a feature map sequence of the reference frame sequence, and then the feature map sequence of the reference frame sequence may be used to enhance or complete the feature map sequence of the current local frame sequence, thereafter, the feature enhanced or feature completed feature map sequence of the current local frame sequence is decoded, and the corresponding image in the current local frame sequence is replaced by the image area corresponding to the mask area in the decoding result, so as to obtain the current local frame sequence after the object being removed or the missing area being completed. In addition, the feature cropping method without information loss described above with reference to FIG. 19 may also be used to crop the feature enhanced or feature completed feature map sequence of the current local frame sequence to obtain the cropped area sequence, then the cropped area sequence is decoded, and an area of the corresponding image frame in the current adjacent frame sequence is replaced by the decoding result of the cropped area sequence.

Figure 24:
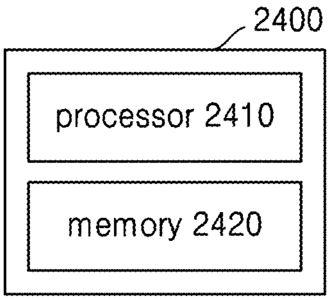
FIG. 24 illustrates an electronic apparatus according to an exemplary embodiment of the disclosure.

FIG. 24 is a block diagram showing an electronic apparatus 2400 according to an exemplary embodiment of the disclosure.

As shown in FIG. 24, the electronic apparatus 2400 includes at least one processor 2410 and at least one memory 2420, wherein, at least one memory 2420 may store computer executable instructions, and the computer executable instructions when being executed by the at least one processor 2410, cause the at least one processor 2410 to perform the video processing method described above.

Compared with the existing method, the adaptive reference frame selection method proposed in the disclosure may ensure the effectiveness and efficiency of reference frame selection, thereby making the effect of object removal, completion of the missing area, etc. better. Compared with the existing methods, the feature aligning and propagation method (module) based on the feature flow proposed in the disclosure may make the video completion effect more stable in timing, thus making the final effect of object removal and completion of the missing area better. Through quantitative comparison by calculating the L1 distance of the corresponding channels of the two aligned features, it may be found that the performance of feature alignment using the feature flow output by the feature flow estimation module is better than the existing methods.

At least one of the above plurality of modules may be implemented through the AI model. Functions associated with AI may be performed by non-volatile memory, volatile memory, and processors.

As an example, the electronic apparatus may be a PC computer, a tablet device, a personal digital assistant, a smart phone, or other devices capable of executing the above set of instructions. Here, the electronic apparatus does not have to be a single electronic apparatus and may also be any device or a collection of circuits that may execute the above instructions (or instruction sets) individually or jointly. The electronic apparatus may also be a part of an integrated control system or a system manager, or may be configured as a portable electronic apparatus interconnected by an interface with a local or remote (e.g., via wireless transmission). A processor may include one or more processors. At this time, the one or more processors may be a general-purpose processor, such as central processing unit (CPU), application processor (AP), etc., and a processor used only for graphics (such as, graphics processing unit (GPU), visual processing unit (VPU), and/or AI dedicated processor (such as, neural processing unit (NPU)). The one or more processors control the processing of input data according to predefined operation rules or AI models stored in a non-volatile memory and a volatile memory. The predefined operation rules or AI models may be provided through training or learning. Here, providing by learning means that the predefined operation rules or AI models with desired characteristics is formed by applying a learning algorithm to a plurality of learning data. The learning may be performed in the apparatus itself executing AI according to the embodiment, and/or may be implemented by a separate server/apparatus/system.

A learning algorithm is a method that uses a plurality of learning data to train a predetermined target apparatus (for example, a robot) to enable, allow, or control the target apparatus to make a determination or prediction. Examples of the learning algorithm include, but are not limited to, supervised learning, unsupervised learning, semi supervised learning, or reinforcement learning.

The AI models may be obtained through training. Here, "obtained through training" refers to training a basic AI model with a plurality of training data through a training algorithm to obtain the predefined operation rules or AI models, which are configured to perform the required features (or purposes).

As an example, the AI models may include a plurality of neural network layers. Each of the plurality of neural network layers includes a plurality of weight values, and a neural network calculation is performed by performing a calculation between the calculation results of the previous layer and the plurality of weight values. Examples of the neural network include, but are not limited to, convolution neural network (CNN), depth neural network (DNN), recurrent neural network (RNN), restricted Boltzmann machine (RBM), depth confidence network (DBN), bidirectional recursive depth neural network (BRDNN), generative countermeasure network (GAN), and depth Q network.

The processor may execute instructions or codes stored in the memory, where the memory may also store data. Instructions and data may also be transmitted and received through a network via a network interface device, wherein the network interface device may use any known transmission protocol.

The memory may be integrated with the processor as a whole, for example, RAM or a flash memory is arranged in an integrated circuit microprocessor or the like. In addition, the memory may include an independent device, such as an external disk drive, a storage array, or other storage device that may be used by any database system. The memory and the processor may be operatively coupled, or may communicate with each other, for example, through an I/O port, a network connection, or the like, so that the processor may read files stored in the memory.

In addition, the electronic apparatus may also include a video display (such as a liquid crystal display) and a user interaction interface (such as a keyboard, a mouse, a touch input device, etc.). All components of the electronic apparatus may be connected to each other via a bus and/or a network.

According to an embodiment of the disclosure, there may also be provided a computer-readable storage medium storing instructions, wherein the instructions, when being executed by at least one processor, cause the at least one processor to execute the above method performed by the electronic apparatus according to the exemplary embodiment of the disclosure. Examples of the computer-readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, Hard Disk Drive (HDD), Solid State Drive (SSD), card storage (such as multimedia card, secure digital (SD) card or extremely fast digital (XD) card), magnetic tape, floppy disk, magneto-optical data storage device, optical data storage device, hard disk, solid state disk and any other devices which are configured to store computer programs and any associated data, data files, and data structures in a non-transitory manner, and provide the computer programs and any associated data, data files, and data structures to the processor or the computer, so that the processor or the computer may execute the computer programs. The instructions and the computer programs in the above computer-readable storage mediums may run in an environment deployed in computer equipment such as a client, a host, an agent device, a server, etc. In addition, in one example, the computer programs and any associated data, data files and data structures are distributed on networked computer systems, so that computer programs and any associated data, data files, and data structures are stored, accessed, and executed in a distributed manner through one or more processors or computers.

According to an embodiment of the disclosure, a method performed by an electronic apparatus may be provided. The method may include determining a local frame sequence from a video. The method may include obtaining a feature map sequence of the local frame sequence by encoding the local frame sequence. The method may include determining a feature flow sequence of the local frame sequence based on the feature map sequence of the local frame sequence and a mask image sequence regarding an object to be removed, the mask image sequence being corresponding to the feature map sequence. The method may include obtaining an updated feature map sequence of the local frame sequence, by performing, based on the feature flow sequence, feature fusion between adjacent feature maps in the feature map sequence. The method may include obtaining a processed local frame sequence, by decoding the updated feature map sequence of the local frame sequence.

The determining the local frame sequence from the video may include splitting, based on scene information, the video to obtain a video sequence. The determining the local frame sequence from the video may include obtaining the local frame sequence, by selecting, based on a predetermined stride, a predetermined number of consecutive image frames from the video sequence as the local frame sequence. The predetermined stride may be less than or equal to the predetermined number.

The method may include determining a reference frame sequence corresponding to the local frame sequence The method may include obtaining a feature map sequence of the reference frame sequence by encoding the reference frame sequence corresponding to the local frame sequence. The decoding the updated feature map sequence of the local frame sequence may include performing feature enhancement or feature completion on the updated feature map sequence of the local frame sequence by using the feature map sequence of the reference frame sequence of the local frame sequence, to obtain the enhanced or completed feature map sequence of the local frame sequence, and decoding the enhanced or completed feature map sequence of the local frame sequence.

The determining the reference frame sequence corresponding to the local frame sequence may include determining a candidate frame sequence from a video sequence to which the local frame sequence belongs, the candidate frame sequence comprising image frames in the video sequence excluding the local frame sequence, and selecting the reference frame sequence corresponding to the local frame sequence from the candidate frame sequence based on a similarity between a candidate image in the candidate frame sequence and a frame image in the local frame sequence, the similarity representing a correlation of a background area and an uncorrelation of a foreground area between the candidate image in the candidate frame sequence and the frame image in the local frame sequence.

The selecting the reference frame sequence corresponding to the local frame sequence from the candidate frame sequence based on the similarity between the candidate image in the candidate frame sequence and the frame image in the local frame sequence may include obtaining the similarity between the candidate image in the candidate frame sequence and the frame image in the local frame sequence by inputting the candidate image in the candidate frame sequence and the frame image in the local frame sequence into a reference frame matching network; based on the similarity being greater than a first threshold, selecting the candidate image as a reference frame and determining whether a sum of similarities of a plurality of reference frames selected for the local frame sequence is greater than a second threshold; and based on the sum of the similarities of the plurality of reference frames selected for the local frame sequence being greater than the second threshold, determining all the reference frames selected for the local frame sequence as the reference frame sequence corresponding to the local frame sequence.

The obtaining the similarity between the candidate image in the candidate frame sequence and the frame image in the local frame sequence by inputting the candidate image in the candidate frame sequence and the frame image in the local frame sequence into the reference frame matching network may include determining a similarity matrix between the candidate image in the candidate frame sequence and the frame image in the local frame sequence, determining an edge attention map based on a mask edge map corresponding to the frame image in the local frame sequence and the similarity matrix, determining a mask attention map based on a mask image of the object to be removed and the similarity matrix. The mask image may be corresponding to the frame image in the local frame sequence; determining a fusion feature map based on the similarity matrix, the edge attention map, and the mask attention map, and obtaining the similarity between the candidate image and the frame image in the local frame sequence based on the fusion feature map.

The determining the similarity matrix between the candidate image in the candidate frame sequence and the frame image in the local frame sequence may include obtaining the similarity matrix between the candidate image and the frame image by concatenating and coding the candidate image in the candidate frame sequence and the frame image in the local frame sequence.

The determining the edge attention map based on the mask edge map corresponding to the frame image and the similarity matrix may include obtaining a heatmap of the mask edge map by convoluting the mask edge map; and obtaining the edge attention map based on the heatmap and the similarity matrix.

The determining the mask attention map based on the mask image of the object to be removed, the mask image being corresponding to the frame image and the similarity matrix may include obtaining a mask similarity matrix based on the mask image of the object to be removed and the similarity matrix; obtaining a mask area feature descriptor based on the mask similarity matrix; and obtaining the mask attention map based on the mask area feature descriptor.

The determining the feature flow sequence of the local frame sequence based on the feature map sequence of the local frame sequence and the mask image sequence regarding the object to be removed may include determining an occlusion mask image sequence and the feature flow sequence of the local frame sequence based on the feature map sequence of the local frame sequence and the mask image sequence regarding the object to be removed; and The obtaining the updated feature map sequence of the local frame sequence may include performing the feature fusion between adjacent feature maps in the feature map sequence to obtain the updated feature map sequence of the local frame sequence based on the occlusion mask image sequence, the feature flow sequence, and the mask image sequence regarding the object to be removed.

The determining the occlusion mask image sequence and the feature flow sequence of the local frame sequence based on the feature map sequence of the local frame sequence and the mask image sequence regarding the object to be removed may include selecting two frames of feature map, the two frames being corresponding to a frame image and an adjacent frame image from the feature map sequence of the local frame sequence, and selecting two frames of mask images of the object to be removed, the two frames being corresponding to the frame image and the adjacent frame image from the mask image sequence regarding the object to be removed; and estimating a feature flow and the occlusion mask image from the adjacent frame image to the frame image by using a feature flow estimation module, based on the two frames of feature maps and the two frames of the mask images of the object to be removed.

The estimating the feature flow and the occlusion mask image from the adjacent frame image to the frame image by using the feature flow estimation module may include determining a forward feature flow and a backward feature flow based on the two frames of feature maps and the two frames of the mask images of the object to be removed; and obtaining the occlusion mask image from the adjacent frame image to the frame image by performing consistency checking on the forward feature flow and the backward feature flow.

The feature flow estimation module may include an N levels of feature flow estimators. N may be a positive integer greater than or equal to one (1). The estimating the feature flow and the occlusion mask image from the adjacent frame image to the frame image by using the feature flow estimation module may include, for a 1st-level of a feature flow estimator, performing feature flow estimation by using the two frames of feature maps and the two frames of mask images of the object to be removed obtained from (N−1)th downsampling, to generate a 1st-level of forward feature flow and a 1st-level of backward feature flow, and obtaining a 1st-level of occlusion mask image from the adjacent frame image to the frame image by performing the consistency checking on the forward feature flow and the backward feature flow. The forward feature flow may represent a 1st-level of feature flow from the frame image to the adjacent frame image. The backward feature flow may represent a 1st-level feature flow from the adjacent frame image to the frame image;

The estimating the feature flow and the occlusion mask image from the adjacent frame image to the frame image by using the feature flow estimation module further may include based on N being greater than or equal to 2, for a nth-level of feature flow estimator, generating a nth-level of feature flow and an nth-level of occlusion mask image from the adjacent frame image to the frame image, by using the two frames of feature maps and the two frames of mask images of the object to be removed obtained from (N−n)th downsampling, and a (n−1)th-level of feature flow, an (n−1)th-level of occlusion mask image from the adjacent frame image to the frame image and an (n−1)th-level of additional feature generated by a (n−1)th-level of feature flow estimator. n may be a positive integer greater than or equal to 2 and the n may be less than or equal to N.

An additional feature generated by a level of the 1st to (N−1)th levels of feature flow estimators may indicate an occlusion area in an occlusion mask image generated by a corresponding level of feature flow estimator.

The performing feature flow estimation by using the two frames of feature maps and the two frames of mask images of the object to be removed obtained from the (N−1)th downsampling, to generate the 1st-level of forward feature flow and the 1st-level of backward feature flow may include: weighting the two frames of feature maps obtained from the (N−1)th downsampling and a corresponding mask image of the object to be removed, respectively, to obtain the two frames of the weighted feature maps; obtaining a forward concatenation feature map and a backward concatenation feature map by performing forward concatenation and backward concatenation on the two frames of the weighted feature maps, respectively; encoding the forward concatenation feature map and the backward concatenation feature map by using a plurality of residual blocks based on a residual network; obtaining the forward feature flow by performing a feature flow prediction on an encoding result of the forward concatenation feature map; and obtaining the backward feature flow by performing a feature flow prediction on an encoding result of the backward concatenation feature map.

The generating the nth-level of feature flow and the nth-level of occlusion mask image from the adjacent frame image to the frame image may include upsampling the (n−1)th-level of feature flow and the (n−1)th-level of occlusion mask image generated by the (n−1)th-level of feature flow estimator, to obtain an upsampled feature flow and an upsampled occlusion mask image; performing feature-weighting and aligning an adjacent feature map corresponding to the adjacent frame image obtained from the (N−n)th downsampling, to obtain the weighted and aligned adjacent feature map, based on the upsampled feature flow and the upsampled occlusion mask image, the (n−1)th-level of additional feature generated by the (n−1)th-level of feature flow estimator, and the mask image of the object to be removed, the mask image being corresponding to the adjacent frame image obtained from the (N−n)th downsampling; weighting the feature map corresponding to the frame image obtained from the (N−n)th downsampling, to obtain a weighted feature image, based on the mask image of the object to be removed, the mask image being corresponding to the frame image obtained from the (N−n)th downsampling; performing backward concatenation between the weighted and aligned adjacent feature map and the weighted feature map, to obtain a backward concatenation feature map; encoding the backward concatenation feature map by using a plurality of residual blocks based on a residual network; performing a feature flow prediction and an occlusion mask prediction based on the encoding result, to obtain the nth-level of feature flow and nth-level of occlusion mask image from the adjacent frame image to the frame image.

The obtaining the weighted and aligned adjacent feature map may include weighting the adjacent feature map by using the upsampled occlusion mask image to obtain the weighted adjacent feature map; performing a convolution processing and a nonlinear-processing by using an activation function, on the mask image of the object to be removed, the mask image being corresponding to the adjacent frame image obtained from the (N−n)th downsampling, to obtain a nonlinear-processed mask image of the object to be removed; performing the convolution processing on the (n−1)th-level of additional feature generated by the (n−1)th-level of feature flow estimator, and obtaining an updated adjacent feature map based on a result of the convolution processing and the weighted adjacent feature map; weighting the updated adjacent feature map by using the nonlinear-processed mask image of the object to be removed, and performing an alignment processing on it by using the upsampled feature flow, to obtain the weighted and aligned adjacent feature map.

The obtaining the updated feature map sequence of the local frame sequence may include selecting an mask image of the object to be removed, the mask image being corresponding to the adjacent frame image of the frame image, from among the mask image sequence regarding the object to be removed, selecting a feature flow from the adjacent frame image to the frame image, from among the feature flow sequence, and selecting an occlusion mask image from the adjacent frame image to the frame image, from among the occlusion mask image sequence; weighting and aligning the feature map corresponding to the adjacent frame image based on the feature flow, the occlusion mask image, and the mask image of the object to be removed, the mask image being corresponding to the adjacent frame image, to obtain the weighted and aligned feature map corresponding to the adjacent frame image; obtaining the updated feature map corresponding to the frame image by performing feature fusion on the feature map corresponding to the frame image and the weighted and aligned feature map corresponding to the adjacent frame image.

The weighting and aligning the feature map corresponding to the adjacent frame image based on the feature flow, the occlusion mask image, and the mask image of the object to be removed, the mask image being corresponding to the adjacent frame image, to obtain the weighted and aligned feature map corresponding to the adjacent frame image may include obtaining an concatenation mask image by performing concatenation on the occlusion mask image and the mask image of the object to be removed, the mask image being corresponding to the adjacent frame image, performing a convolution processing and a nonlinear-processing by using an activation function on the concatenation mask image to obtain a nonlinear-processed concatenation mask image; obtaining the weighted feature map corresponding to the adjacent frame image by weighting the feature map corresponding to the adjacent frame image by using the nonlinear-processed concatenation mask image; and obtaining the weighted and aligned feature map corresponding to the adjacent frame image by performing a feature aligning on the weighted feature map corresponding to the adjacent frame image by using the feature flow.

The obtaining the updated feature map corresponding to the frame image by performing feature fusion on the feature map corresponding to the frame image and the weighted and aligned feature map corresponding to the adjacent frame image may include performing concatenation on the feature map corresponding to the frame image and the weighted and aligned feature map corresponding to the adjacent frame image, to obtain the concatenation feature map; and performing a convolution processing on the concatenation feature map, to obtain the updated feature map corresponding to the frame image.

The decoding based on the enhanced or completed feature map sequence of the local frame sequence may include determining a maximum bounding box of a mask area based on the mask image sequence regarding the object to be removed; determining a calculation area of the maximum bounding box of the mask area on the enhanced or completed feature map sequence of the local frame sequence; cropping the enhanced or completed feature map sequence of the local frame sequence based on the calculation area; and decoding the cropped enhanced or completed feature map sequence.

The determining the maximum bounding box of the mask area based on the mask image sequence regarding the object to be removed may include calculating a receptive field of a decoder for the decoding; scaling the maximum bounding box of the mask area based on a resolution ratio between the enhanced or completed feature map sequence and an original feature map sequence of the local frame sequence; and expanding the maximum bounding box of a scaled mask area based on the receptive field to obtain the calculation area.

According to an embodiment of the disclosure, a method performed by an electronic apparatus may be provided. The method may include determining a local frame sequence from a video sequence of a video; and determining a reference frame sequence corresponding to the local frame sequence, from the video, and performing inpainting processing for the local frame sequence based on the reference frame sequence.

The determining the reference frame sequence corresponding to the local frame sequence from the video may include: determining a candidate frame sequence from a video sequence to which a local frame sequence belongs, wherein the candidate frame sequence comprises image frames in the video sequence excluding the local frame sequence; and selecting the reference frame sequence corresponding to the local frame sequence from the candidate frame sequence based on a similarity between a frame image in the candidate frame sequence and a frame image in the local frame sequence. The similarity may represent at least one of a correlation of a background area and an uncorrelation of a foreground area between the frame image in the candidate frame sequence and the frame image in the local frame sequence.

According to an embodiment of the disclosure, an electronic apparatus, may be provided. The electronic apparatus may include a processor; and a memory storing computer executable instructions. The computer executable instructions, when being executed by the processor, may cause the at least one processor to perform the above method.

According to an embodiment of the disclosure, a computer-readable storage medium storing instructions may be provided. The instructions, when being executed by a processor, may cause the processor to perform the above method.

It should be noted that the terms “first”, “second”, “third”, “fourth”, “1”, “2” and the like (if exists) in the description and claims of the disclosure and the above drawings are used to distinguish similar objects, and need not be used to describe a specific order or sequence. It should be understood that data used as such may be interchanged in appropriate situations, so that the embodiments of the disclosure described here may be implemented in an order other than the illustration or text description.

It should be understood that although each operation is indicated by arrows in the flowcharts of the embodiments of the disclosure, an implementation order of these operations is not limited to an order indicated by the arrows. Unless explicitly stated herein, in some implementation scenarios of the embodiments of the disclosure, the implementation operations in the flowcharts may be executed in other orders according to requirements. In addition, some or all of the operations in each flowchart may include a plurality of sub operations or stages, based on an actual implementation scenario. Some or all of these sub operations or stages may be executed at the same time, and each sub operation or stage in these sub operations or stages may also be executed at different times. In scenarios with different execution times, an execution order of these sub operations or stages may be flexibly configured according to requirements, which is not limited by the embodiment of the disclosure.

The above description is only an alternative implementation of some implementation scenarios of the disclosure. It should be pointed out that for those ordinary skilled in the art, adopting other similar implementation means based on a technical idea of the disclosure also belongs to a protection scope of the embodiment of the disclosure, without departing from a technical concept of the disclosure.

What is claimed is:

1. A method performed by an electronic apparatus, comprising:

determining a local frame sequence from a video;

obtaining a feature map sequence of the local frame sequence by encoding the local frame sequence;

determining a feature flow sequence of the local frame sequence based on the feature map sequence of the local frame sequence and a mask image sequence regarding an object to be removed, the mask image sequence being corresponding to the feature map sequence;

obtaining an updated feature map sequence of the local frame sequence, by performing, based on the feature flow sequence, feature fusion between adjacent feature maps in the feature map sequence; and obtaining a processed local frame sequence, by decoding the updated feature map sequence of the local frame sequence, wherein the determining the feature flow sequence of the local frame sequence based on the feature map sequence of the local frame sequence and the mask image sequence regarding the object to be removed comprises: determining an occlusion mask image sequence and the feature flow sequence of the local frame sequence based on the feature map sequence of the local frame sequence and the mask image sequence regarding the object to be removed, and wherein the obtaining the updated feature map sequence of the local frame sequence comprises: performing the feature fusion between adjacent feature maps in the feature map sequence based on the occlusion mask image sequence, the feature flow sequence, and the mask image sequence regarding the object to be removed.

2. The method of claim 1, wherein the determining the local frame sequence from the video comprises:

splitting, based on scene information, the video to obtain a video sequence; and obtaining the local frame sequence, by selecting, based on a predetermined stride, a predetermined number of consecutive image frames from the video sequence as the local frame sequence, and wherein the predetermined stride is less than or equal to the predetermined number.

3. The method of claim 1, further comprising:

determining a reference frame sequence corresponding to the local frame sequence; and obtaining a feature map sequence of the reference frame sequence by encoding the reference frame sequence corresponding to the local frame sequence, wherein the decoding the updated feature map sequence of the local frame sequence comprises:

performing feature enhancement or feature completion on the updated feature map sequence of the local frame sequence by using the feature map sequence of the reference frame sequence corresponding to the local frame sequence, to obtain the enhanced or completed feature map sequence of the local frame sequence, and decoding the enhanced or completed feature map sequence of the local frame sequence.

4. The method of claim 3, wherein the determining the reference frame sequence corresponding to the local frame sequence comprises:

determining a candidate frame sequence from a video sequence to which the local frame sequence belongs, the candidate frame sequence comprising image frames in the video sequence excluding the local frame sequence; and selecting the reference frame sequence corresponding to the local frame sequence from the candidate frame sequence based on a similarity between a candidate image in the candidate frame sequence and a frame image in the local frame sequence, the similarity representing a correlation of a background area and an uncorrelation of a foreground area between the candidate image in the candidate frame sequence and the frame image in the local frame sequence.

5. The method of claim 4, wherein the selecting the reference frame sequence corresponding to the local frame sequence from the candidate frame sequence based on the similarity between the candidate image in the candidate frame sequence and the frame image in the local frame sequence comprises:

obtaining the similarity between the candidate image in the candidate frame sequence and the frame image in the local frame sequence by inputting the candidate image in the candidate frame sequence and the frame image in the local frame sequence into a reference frame matching network;

based on the similarity being greater than a first threshold, selecting the candidate image as a reference frame and determining whether a sum of similarities of a plurality of reference frames selected for the local frame sequence is greater than a second threshold; and based on the sum of the similarities of the plurality of reference frames selected for the local frame sequence being greater than the second threshold, determining the plurality of reference frames selected for the local frame sequence as the reference frame sequence corresponding to the local frame sequence.

6. The method of claim 5, wherein the obtaining the similarity between the candidate image in the candidate frame sequence and the frame image in the local frame sequence by inputting the candidate image in the candidate frame sequence and the frame image in the local frame sequence into the reference frame matching network comprises:

determining a similarity matrix between the candidate image in the candidate frame sequence and the frame image in the local frame sequence;

determining an edge attention map based on a mask edge map corresponding to the frame image in the local frame sequence and the similarity matrix;

determining a mask attention map based on a mask image of the object to be removed and the similarity matrix, the mask image being corresponding to the frame image in the local frame sequence;

determining a fusion feature map based on the similarity matrix, the edge attention map, and the mask attention map; and obtaining the similarity between the candidate image and the frame image in the local frame sequence based on the fusion feature map.

7. The method of claim 6, wherein the determining the similarity matrix between the candidate image in the candidate frame sequence and the frame image in the local frame sequence comprises obtaining the similarity matrix between the candidate image and the frame image by concatenating and coding the candidate image in the candidate frame sequence and the frame image in the local frame sequence.

8. The method of claim 1, wherein the determining the occlusion mask image sequence and the feature flow sequence of the local frame sequence based on the feature map sequence of the local frame sequence and the mask image sequence regarding the object to be removed comprises:

selecting two frames of feature maps, the two frames being corresponding to a frame image and an adjacent frame image from the feature map sequence of the local frame sequence, and selecting two frames of mask images of the object to be removed, the two frames being corresponding to the frame image and the adjacent frame image from the mask image sequence regarding the object to be removed; and estimating a feature flow and the occlusion mask image from the adjacent frame image to the frame image by using a feature flow estimation module, based on the two frames of the feature maps and the two frames of the mask images of the object to be removed.

9. The method of claim 8, wherein the estimating the feature flow and the occlusion mask image from the adjacent frame image to the frame image by using the feature flow estimation module comprises:

determining a forward feature flow and a backward feature flow based on the two frames of the feature maps and the two frames of the mask images of the object to be removed; and obtaining the occlusion mask image from the adjacent frame image to the frame image by performing consistency checking on the forward feature flow and the backward feature flow.

10. The method of claim 9, wherein the feature flow estimation module comprises an N levels of feature flow estimators, wherein N is a positive integer greater than or equal to one (1); and wherein the estimating the feature flow and the occlusion mask image from the adjacent frame image to the frame image by using the feature flow estimation module comprises:

for a 1st-level of a feature flow estimator, performing feature flow estimation by using the two frames of the feature maps and the two frames of the mask images of the object to be removed obtained from (N−1)th downsampling, to generate a 1st-level of the forward feature flow and a 1st-level of the backward feature flow, wherein the forward feature flow represents a 1st-level of feature flow from the frame image to the adjacent frame image, and wherein the backward feature flow represents a 1st-level feature flow from the adjacent frame image to the frame image;

obtaining a 1st-level of the occlusion mask image from the adjacent frame image to the frame image by performing the consistency checking on the forward feature flow and the backward feature flow.

11. The method of claim 10, wherein the estimating the feature flow and the occlusion mask image from the adjacent frame image to the frame image by using the feature flow estimation module further comprises:

based on N being greater than or equal to 2, for a nth-level of feature flow estimator, generating a nth-level of feature flow and an nth-level of the occlusion mask image from the adjacent frame image to the frame image, by using the two frames of the feature maps and the two frames of the mask images of the object to be removed obtained from (N−n)th downsampling, and a (n−1)th-level of the feature flow, an (n−1)th-level of the occlusion mask image from the adjacent frame image to the frame image and an (n−1)th-level of an additional feature generated by a (n−1)th-level of the feature flow estimator, wherein n is a positive integer greater than or equal to 2 and wherein the n is less than or equal to N, and wherein an additional feature generated by a level of the 1st level to (N−1)th level of feature flow estimators indicates an occlusion area in an occlusion mask image generated by a corresponding level of feature flow estimator.

12. The method of claim 11, wherein the performing feature flow estimation by using the two frames of the feature maps and the two frames of the mask images of the object to be removed obtained from the (N−1)th downsampling, to generate the 1st-level of the forward feature flow and the 1st-level of the backward feature flow comprises:

weighting the two frames of the feature maps obtained from the (N−1)th downsampling and a corresponding mask image of the object to be removed, respectively, to obtain the two frames of the weighted feature maps;

obtaining a forward concatenation feature map and a backward concatenation feature map by performing forward concatenation and backward concatenation on the two frames of the weighted feature maps, respectively;

encoding the forward concatenation feature map and the backward concatenation feature map by using a plurality of residual blocks based on a residual network;

obtaining the forward feature flow by performing a feature flow prediction on an encoding result of the forward concatenation feature map; and obtaining the backward feature flow by performing a feature flow prediction on an encoding result of the backward concatenation feature map.

13. The method of claim 11, wherein the generating the nth-level of feature flow and the nth-level of the occlusion mask image from the adjacent frame image to the frame image comprises:

upsampling the (n−1)th-level of the feature flow and the (n−1)th-level of the occlusion mask image generated by the (n−1)th-level of the feature flow estimator, to obtain an upsampled feature flow and an upsampled occlusion mask image;

performing feature-weighting and aligning an adjacent feature map corresponding to the adjacent frame image obtained from the (N−n)th downsampling, to obtain the weighted and aligned adjacent feature map, based on the upsampled feature flow and the upsampled occlusion mask image, the (n−1)th-level of the additional feature generated by the (n−1)th-level of the feature flow estimator, and the mask a mask image of the object to be removed, the mask image being corresponding to the adjacent frame image obtained from the (N−n)th downsampling;

weighting a feature map corresponding to the frame image obtained from the (N−n)th downsampling, to obtain a weighted feature image, based on the mask image of the object to be removed, the mask image being corresponding to the frame image obtained from the (N−n)th downsampling;

performing backward concatenation between the weighted and aligned adjacent feature map and the weighted feature map, to obtain a backward concatenation feature map;

encoding the backward concatenation feature map by using a plurality of residual blocks based on a residual network; and performing a feature flow prediction and an occlusion mask prediction based on an encoding result, to obtain the nth-level of feature flow and nth-level of the occlusion mask image from the adjacent frame image to the frame image.

14. The method of claim 13, wherein the obtaining the weighted and aligned adjacent feature map comprises:

weighting the adjacent feature map by using the upsampled occlusion mask image to obtain the weighted adjacent feature map;

performing a convolution processing and a nonlinear-processing by using an activation function, on the mask image of the object to be removed, the mask image being corresponding to the adjacent frame image obtained from the (N−n)th downsampling, to obtain a nonlinear-processed mask image of the object to be removed;

performing the convolution processing on the (n−1)th-level of the additional feature generated by the (n−1)th-level of the feature flow estimator, and obtaining an updated adjacent feature map based on a result of the convolution processing and the weighted adjacent feature map; and weighting the updated adjacent feature map by using the nonlinear-processed mask image of the object to be removed, and performing an alignment processing on it by using the upsampled feature flow, to obtain the weighted and aligned adjacent feature map.

15. The method of claim 14, wherein the obtaining the updated feature map sequence of the local frame sequence comprises:

selecting a mask image of the object to be removed, the mask image being corresponding to the adjacent frame image of the frame image, from among the mask image sequence regarding the object to be removed, selecting the feature flow from the adjacent frame image to the frame image, from among the feature flow sequence, and selecting an occlusion mask image from the adjacent frame image to the frame image, from among the occlusion mask image sequence;

weighting and aligning the feature map corresponding to the adjacent frame image based on the feature flow, the occlusion mask image, and the mask image of the object to be removed, the mask image being corresponding to the adjacent frame image, to obtain the weighted and aligned feature map corresponding to the adjacent frame image; and obtaining the updated feature map corresponding to the frame image by performing feature fusion on the feature map corresponding to the frame image and the weighted and aligned feature map corresponding to the adjacent frame image.

16. The method of claim 3, wherein the decoding based on the enhanced or completed feature map sequence of the local frame sequence comprises:

determining a maximum bounding box of a mask area based on the mask image sequence regarding the object to be removed;

determining a calculation area of the maximum bounding box of the mask area on the enhanced or completed feature map sequence of the local frame sequence;

cropping the enhanced or completed feature map sequence of the local frame sequence based on the calculation area; and decoding the cropped enhanced or completed feature map sequence.

17. The method of claim 16, wherein the determining the maximum bounding box of the mask area based on the mask image sequence regarding the object to be removed comprises:

calculating a receptive field of a decoder for the decoding;

scaling the maximum bounding box of the mask area based on a resolution ratio between the enhanced or completed feature map sequence and an original feature map sequence of the local frame sequence; and expanding the scaled maximum bounding box of the mask area based on the receptive field to obtain the calculation area.

18. An electronic apparatus comprising:

at least one processor; and a memory storing computer executable instructions, wherein the computer executable instructions, when being executed by the at least one processor, cause the electronic apparatus to:

determine a local frame sequence from a video;

obtain a feature map sequence of the local frame sequence by encoding the local frame sequence;

determine a feature flow sequence of the local frame sequence based on the feature map sequence of the local frame sequence and a mask image sequence regarding an object to be removed, the mask image sequence being corresponding to the feature map sequence;

obtain an updated feature map sequence of the local frame sequence, by performing, based on the feature flow sequence, feature fusion between adjacent feature maps in the feature map sequence; and obtain a processed local frame sequence, by decoding the updated feature map sequence of the local frame sequence, wherein the determining the feature flow sequence of the local frame sequence based on the feature map sequence of the local frame sequence and the mask image sequence regarding the object to be removed comprises: determining an occlusion mask image sequence and the feature flow sequence of the local frame sequence based on the feature map sequence of the local frame sequence and the mask image sequence regarding the object to be removed, and wherein the obtaining the updated feature map sequence of the local frame sequence comprises: performing the feature fusion between adjacent feature maps in the feature map sequence based on the occlusion mask image sequence, the feature flow sequence, and the mask image sequence regarding the object to be removed.

19. A non-statutory computer-readable storage medium storing instructions, wherein the instructions, when being executed by a processor, cause the processor to perform the method according to claim 1.

* * * * *